US011838893B2

(12) United States Patent
Huang et al.

(10) Patent No.: US 11,838,893 B2
(45) Date of Patent: Dec. 5, 2023

(54) RESOURCE SELECTION AND RESERVATION FOR COOPERATIVE RELAY IN SIDELINK NETWORKS

(71) Applicant: QUALCOMM Incorporated, San Diego, CA (US)

(72) Inventors: Yi Huang, San Diego, CA (US); Wei Yang, San Diego, CA (US); Seyedkianoush Hosseini, San Diego, CA (US); Peter Gaal, San Diego, CA (US); Wanshi Chen, San Diego, CA (US); Tingfang Ji, San Diego, CA (US); Krishna Kiran Mukkavilli, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 17/190,741

(22) Filed: Mar. 3, 2021

(65) Prior Publication Data

US 2022/0287005 A1    Sep. 8, 2022

(51) Int. Cl.
*H04W 72/02* (2009.01)
*H04W 28/26* (2009.01)
*H04W 24/10* (2009.01)
*H04W 72/121* (2023.01)
*H04W 80/02* (2009.01)
*H04W 72/20* (2023.01)
(Continued)

(52) U.S. Cl.
CPC ........... *H04W 72/02* (2013.01); *H04W 24/10* (2013.01); *H04W 28/26* (2013.01); *H04W 72/121* (2013.01); *H04W 72/20* (2023.01); *H04W 72/569* (2023.01); *H04W 80/02* (2013.01); *H04W 92/18* (2013.01)

(58) Field of Classification Search
None
See application file for complete search history.

(56) References Cited

U.S. PATENT DOCUMENTS

2010/0278136 A1* 11/2010 Oyman ............... H04W 52/146
370/330
2015/0208381 A1* 7/2015 Fujishiro ............... H04L 5/0032
455/450

(Continued)

*Primary Examiner* — Alex Skripnikov
*Assistant Examiner* — Pamit Kaur
(74) *Attorney, Agent, or Firm* — Holland & Hart LLP

(57) ABSTRACT

Methods, systems, and devices for wireless communications are described for relayed sidelink communications in which a set of relays receives a groupcast sidelink communication from a source and relay the communication to a destination using cooperative multiple-input multiple-output (MIMO) techniques. A source, such as a source user equipment (UE), may reserve resources for the groupcast sidelink communication and the cooperative MIMO transmissions, and may transmit a resource reservation message with an indication of the reserved resources. The resource reservation message may be transmitted in a sidelink control information transmission, in a medium access control message, or any combinations thereof. In the event of a collision in reserved resources of multiple different sources, the sources or relays may determine a priority of each communication and transmit a selected communication based on the priority determination.

30 Claims, 22 Drawing Sheets

(51) Int. Cl.
*H04W 72/566* (2023.01)
*H04W 92/18* (2009.01)

(56) References Cited

U.S. PATENT DOCUMENTS

| | | | |
|---|---|---|---|
| 2018/0324882 A1 | 11/2018 | Gulati et al. | |
| 2020/0029340 A1* | 1/2020 | He | H04W 76/14 |
| 2020/0106539 A1* | 4/2020 | Yu | H04W 76/00 |
| 2021/0212025 A1* | 7/2021 | Selvanesan | H04W 72/30 |
| 2022/0078755 A1* | 3/2022 | Xu | H04W 72/02 |
| 2022/0386252 A1* | 12/2022 | Lee | H04W 72/23 |

* cited by examiner

RESOURCE SELECTION AND RESERVATION FOR COOPERATIVE RELAY IN SIDELINK NETWORKS

FIELD OF TECHNOLOGY

The present disclosure relates to wireless communications, including resource selection and reservation for cooperative relay in sidelink networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, multiple UEs may communicate with each other over a sidelink channel. For example, the sidelink channel may include device-to-device (D2D) communications, vehicle-to-vehicle (V2V) communications, vehicle-to-everything (V2X) communications, etc. Additionally, a transmitting UE and a receiving UE may experience relatively poor channel conditions in some cases, which may result in a lower likelihood of successful communications. In order to provide enhanced reliability in such cases, one or more other UEs may act as relay UEs that receive the communication from the transmitting UE and relay the communication to the receiving UE. Such relay techniques may enhance the reliability of communications, but consume network resources, and thus efficient techniques are desired for implementing relayed communications.

SUMMARY

The described techniques relate to improved methods, systems, devices, and apparatuses that support resource selection and reservation for cooperative relay in sidelink networks. Various aspects of the present disclosure provide techniques for a source UE, one or more relay UEs, and a destination UE to communicate using sidelink communications in which communications between the source UE and the destination UE are relayed via the one or more relay UEs. In some cases the source UE may transmit a source UE communication, using groupcast sidelink transmissions, to a set of one or more relay UEs. The set of relay UEs may transmit the source UE communication to the destination UE using cooperative multiple-input multiple-output (MIMO) transmissions. In some cases, the source UE may reserve resources for the groupcast sidelink transmissions and the cooperative MIMO transmissions, and may transmit a resource reservation message with an indication of the reserved resources. In some cases, the resource reservation message may be transmitted in a sidelink control information (SCI) transmission. In other cases, all or part of the resource reservation message may be sent in a medium access control (MAC) control element (CE) in a physical sidelink shared channel (PSSCH) transmission. In some cases, in the event of a collision in reserved resources of multiple different source UEs, the source UEs or relay UEs may determine a priority and transmit a communication based on the priority determination.

A method for wireless communication at a source UE is described. The method may include transmitting, to a set of relay UEs, a resource reservation message that indicates a first set of resources for a source UE communication from the source UE to the set of relay UEs, and a second set of resources for one or more relay transmissions of the source UE communication from the set of relay UEs to a destination UE, where the first set of resources are groupcast sidelink resources for a groupcast sidelink communication from the source UE to the set of relay UEs, and the second set of resources are cooperative MIMO resources for cooperative MIMO sidelink communications from the set of relay UEs to the destination UE and transmitting the source UE communication to the set of relay UEs in the groupcast sidelink communication using the first set of resources.

An apparatus for wireless communication at a source UE is described. The apparatus may include a processor, memory coupled with the processor, and instructions stored in the memory. The instructions may be executable by the processor to cause the apparatus to transmit, to a set of relay UEs, a resource reservation message that indicates a first set of resources for a source UE communication from the source UE to the set of relay UEs, and a second set of resources for one or more relay transmissions of the source UE communication from the set of relay UEs to a destination UE, where the first set of resources are groupcast sidelink resources for a groupcast sidelink communication from the source UE to the set of relay UEs, and the second set of resources are cooperative MIMO resources for cooperative MIMO sidelink communications from the set of relay UEs to the destination UE and transmit the source UE communication to the set of relay UEs in the groupcast sidelink communication using the first set of resources.

Another apparatus for wireless communication at a source UE is described. The apparatus may include means for transmitting, to a set of relay UEs, a resource reservation message that indicates a first set of resources for a source UE communication from the source UE to the set of relay UEs, and a second set of resources for one or more relay transmissions of the source UE communication from the set of relay UEs to a destination UE, where the first set of resources are groupcast sidelink resources for a groupcast sidelink communication from the source UE to the set of relay UEs, and the second set of resources are cooperative MIMO resources for cooperative MIMO sidelink communications from the set of relay UEs to the destination UE and means for transmitting the source UE communication to the set of relay UEs in the groupcast sidelink communication using the first set of resources.

A non-transitory computer-readable medium storing code for wireless communication at a source UE is described. The code may include instructions executable by a processor to transmit, to a set of relay UEs, a resource reservation message that indicates a first set of resources for a source UE communication from the source UE to the set of relay UEs, and a second set of resources for one or more relay transmissions of the source UE communication from the set of relay UEs to a destination UE, where the first set of resources are groupcast sidelink resources for a groupcast sidelink communication from the source UE to the set of relay UEs, and the second set of resources are cooperative MIMO resources for cooperative MIMO sidelink communications from the set of relay UEs to the destination UE and transmit the source UE communication to the set of relay UEs in the groupcast sidelink communication using the first set of resources.

In some examples of the method, apparatuses, and non-transitory computer-readable medium described herein, the transmitting the resource reservation message may include operations, features, means, or instructions for transmitting sidelink control information (SCI) in a sidelink control channel to each UE of the set of relay UEs, where the SCI indicates the first set of resources and the second set of resources. In some examples of the method, apparatuses, and non-transitory computer-readable medium described herein, the transmitting the resource reservation message may include operations, features, means, or instructions for transmitting a first indication of the first set of resources in a sidelink groupcast scheduling message to each UE of the set of relay UEs and transmitting a second indication of the second set of resources in a medium access control (MAC) control element (CE) in a sidelink shared channel of the groupcast sidelink communication using the first set of resources.

Some examples of the method, apparatuses, and non-transitory computer-readable medium described herein may further include operations, features, means, or instructions for receiving a feedback indication from one or more relay UEs of the set of relay UEs that indicates the source UE transmission is unsuccessfully received at the set of relay UEs and retransmitting the source UE communication to the set of relay UEs using the second set of resources.

In some examples of the method, apparatuses, and non-transitory computer-readable medium described herein, the cooperative MIMO sidelink communications from the set of relay UEs to the destination UE are for asynchronized MIMO communications, and where the retransmitting uses a first available resource of the second set of resources. Some examples of the method, apparatuses, and non-transitory computer-readable medium described herein may further include operations, features, means, or instructions for determining a third set of resources for the one or more relay transmissions of the source UE communication from the set of relay UEs to the destination UE and transmitting an indication of the third set of resources to the set of relay UEs.

In some examples of the method, apparatuses, and non-transitory computer-readable medium described herein, the second set of resources may be for synchronized MIMO communications between the set of relay UEs and the destination UE, and where the destination UE provides an indication of a fourth set of resources for retransmissions of the synchronized MIMO communications based on unsuccessful receipt of the one or more relay transmissions. In some examples of the method, apparatuses, and non-transitory computer-readable medium described herein, the second set of resources may be for asynchronized MIMO communications between the set of relay UEs and the destination UE, and where each relay UE of the set of relay UEs determines an associated retransmission resource based on an unsuccessful receipt of the one or more relay transmissions.

In some examples of the method, apparatuses, and non-transitory computer-readable medium described herein, the first set of resources includes multiple periodic resource reservations for a first predetermined number of instances of the source UE communication, and the second set of resources includes multiple periodic resource reservations for a second predetermined number of instances of the cooperative MIMO sidelink communications from the set of relay UEs to the destination UE, and where each of the first set of resources and the second set of resources are associated with a source ID of the source UE. Some examples of the method, apparatuses, and non-transitory computer-readable medium described herein may further include operations, features, means, or instructions for receiving, at the source UE from one or more relay UEs of the set of relay UEs, a block feedback indication of successful or unsuccessful receipt of the source UE communication at the associated relay UE and determining a new first set of resources and new second set of resources when the block feedback indication indicates unsuccessful receipt of the source UE communication. In some examples of the method, apparatuses, and non-transitory computer-readable medium described herein, the destination UE reserves a set of periodic MIMO retransmission resources based on an unsuccessful decoding of the cooperative MIMO sidelink communications in the second set of resources.

Some examples of the method, apparatuses, and non-transitory computer-readable medium described herein may further include operations, features, means, or instructions for determining that a different source UE has indicated overlapping resources with one or more of the first set of resources or the second set of resources, and transmitting or preempting the source UE communication based on a priority associated with the source UE communication and a relayed communication of the different source UE. In some examples of the method, apparatuses, and non-transitory computer-readable medium described herein, each relay UE of the set of relay UEs determines which of the source UE communication or a different communication of a different source UE is to be transmitted to the destination UE when the second set of resources overlaps with relay resources reserved by the different source UE, and where the determination is based on a priority of the associated communication, a timing of the associated communication, or any combinations thereof.

A method for wireless communication at a relay UE is described. The method may include receiving, from a source UE, a resource reservation message that indicates a first set of resources for a source UE communication from the source UE, and a second set of resources for one or more relay transmissions of the source UE communication to a destination UE, where the first set of resources are groupcast sidelink resources for a groupcast sidelink communication from the source UE to the relay UE, and the second set of resources are cooperative MIMO resources for cooperative MIMO sidelink communications between the relay UE and the destination UE and monitoring the first set of resources for the source UE communication.

An apparatus for wireless communication at a relay UE is described. The apparatus may include a processor, memory coupled with the processor, and instructions stored in the memory. The instructions may be executable by the processor to cause the apparatus to receive, from a source UE, a resource reservation message that indicates a first set of resources for a source UE communication from the source UE, and a second set of resources for one or more relay transmissions of the source UE communication to a destination UE, where the first set of resources are groupcast sidelink resources for a groupcast sidelink communication from the source UE to the relay UE, and the second set of resources are cooperative MIMO resources for cooperative MIMO sidelink communications between the relay UE and the destination UE and monitor the first set of resources for the source UE communication.

Another apparatus for wireless communication at a relay UE is described. The apparatus may include means for receiving, from a source UE, a resource reservation message that indicates a first set of resources for a source UE communication from the source UE, and a second set of resources for one or more relay transmissions of the source UE communication to a destination UE, where the first set of resources are groupcast sidelink resources for a groupcast sidelink communication from the source UE to the relay UE, and the second set of resources are cooperative MIMO resources for cooperative MIMO sidelink communications between the relay UE and the destination UE and means for monitoring the first set of resources for the source UE communication.

A non-transitory computer-readable medium storing code for wireless communication at a relay UE is described. The code may include instructions executable by a processor to receive, from a source UE, a resource reservation message that indicates a first set of resources for a source UE communication from the source UE, and a second set of resources for one or more relay transmissions of the source UE communication to a destination UE, where the first set of resources are groupcast sidelink resources for a groupcast sidelink communication from the source UE to the relay UE, and the second set of resources are cooperative MIMO resources for cooperative MIMO sidelink communications between the relay UE and the destination UE and monitor the first set of resources for the source UE communication.

In some examples of the method, apparatuses, and non-transitory computer-readable medium described herein, the receiving the resource reservation message may include operations, features, means, or instructions for receiving SCI in a sidelink control channel from the source UE, where the SCI indicates the first set of resources and the second set of resources and receiving a first indication of the first set of resources in a sidelink groupcast scheduling message from the source UE, and receiving a second indication of the second set of resources in a MAC-CE in a sidelink shared channel of the groupcast sidelink communication using the first set of resources.

Some examples of the method, apparatuses, and non-transitory computer-readable medium described herein may further include operations, features, means, or instructions for transmitting a feedback indication to the source UE that indicates the source UE transmission are unsuccessfully received at the relay UE and monitoring for a retransmission of the source UE communication using the second set of resources. Some examples of the method, apparatuses, and non-transitory computer-readable medium described herein may further include operations, features, means, or instructions for receiving, from the source UE, a third set of resources for the one or more relay transmissions of the source UE communication to the destination UE. In some examples of the method, apparatuses, and non-transitory computer-readable medium described herein, the destination UE provides an indication of a fourth set of resources for retransmissions of synchronized MIMO communications based on unsuccessful receipt of one or more relay transmissions from the relay UE and where the relay UE determines the fourth set of resources for retransmissions of asynchronized MIMO communications based on unsuccessful receipt of the one or more relay transmissions at the destination UE.

In some examples of the method, apparatuses, and non-transitory computer-readable medium described herein, the first set of resources includes multiple periodic resource reservations for a first predetermined number of instances of the source UE communication, and the second set of resources includes multiple periodic resource reservations for a second predetermined number of instances of the cooperative MIMO sidelink communications from the relay UE to the destination UE, and where each of the first set of resources and the second set of resources is associated with a source ID of the source UE. In some examples of the method, apparatuses, and non-transitory computer-readable medium described herein, the destination UE reserves a set of periodic MIMO retransmission resources based on an unsuccessful decoding of the cooperative MIMO sidelink communications in the second set of resources.

Some examples of the method, apparatuses, and non-transitory computer-readable medium described herein may further include operations, features, means, or instructions for determining that a different source UE has indicated overlapping resources with one or more of the first set of resources or the second set of resources and selecting which source UE to monitor based on a priority associated with the source UE communication and a relayed communication of the different source UE. Some examples of the method, apparatuses, and non-transitory computer-readable medium described herein may further include operations, features, means, or instructions for determining that the second set of resources overlaps with a third set of resources reserved by a different source UE for one or more different relay transmissions of the different source UE and selecting which relay transmission to transmit to the destination UE based on a priority of the associated communication, a timing of the associated communication, or any combinations thereof.

DETAILED DESCRIPTION

Figure 1:
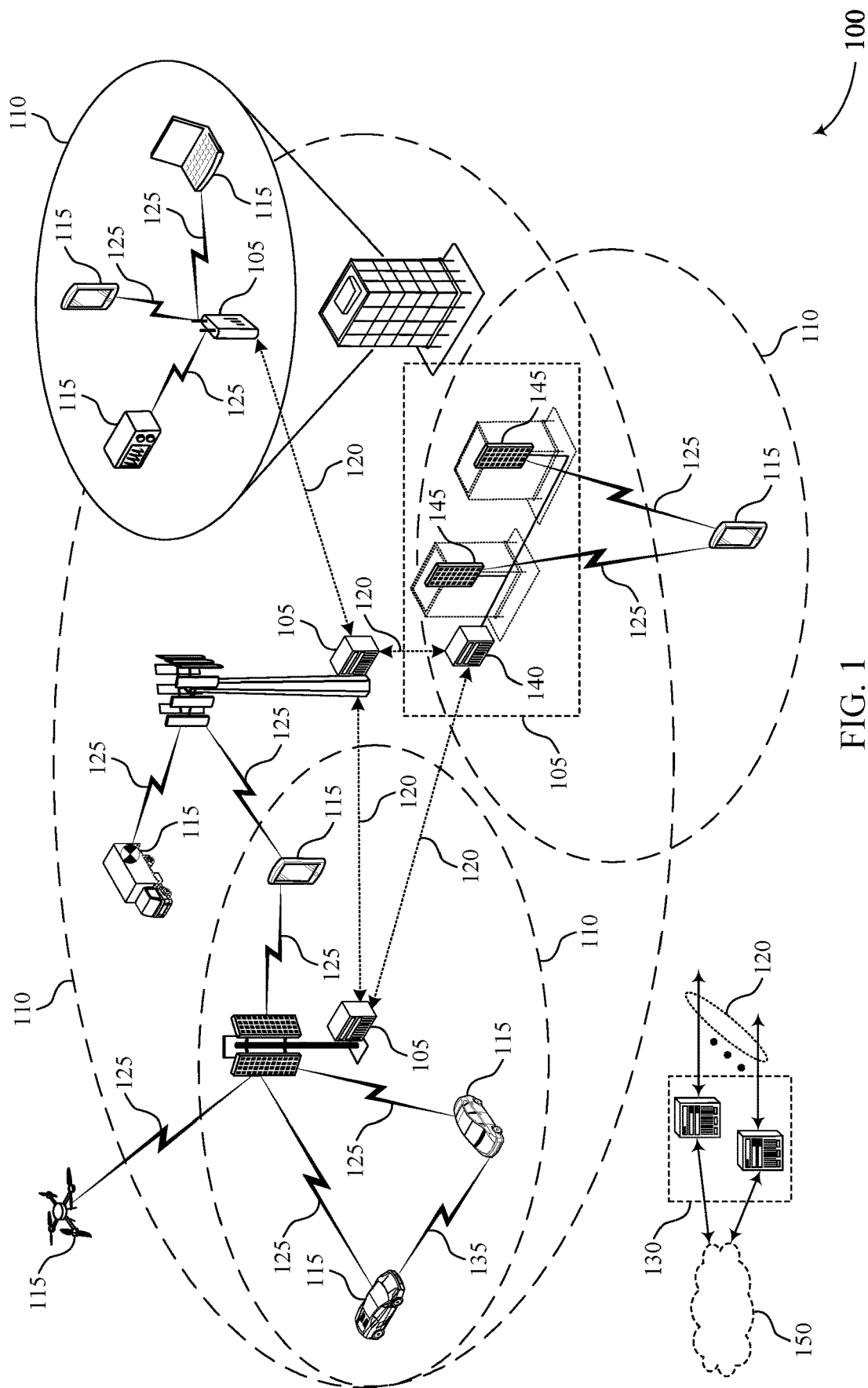
FIG. 1 illustrates an example of a wireless communications system that supports resource selection and reservation for cooperative relay in sidelink networks in accordance with aspects of the present disclosure.

In some wireless communications systems, a user equipment (UE) may communicate with one or more other UEs over a sidelink channel such that communications between the UEs are not routed through a base station. For example, the sidelink channel may provide device-to-device (D2D) communications, vehicle-to-vehicle (V2V) communications, vehicle-to-everything (V2X) communications, etc. UEs in sidelink communications may experience relatively rapid changes to channel conditions that may negatively impact communications between a transmitting UE (e.g., a source UE) and a desired receiving UE (e.g., a destination UE). For example, in V2X communications the presence of one or more vehicles in proximity to a source UE may result in a blockage or interference in communications between the source UE and a destination UE. Similar situations may arise in other sidelink scenarios, such as in factory automation where blocking or interference may occur relatively frequently. In order to mitigate communications gaps in such scenarios, cooperative relay schemes may allow a source UE to use one or more relay UEs to relay a communication from the source UE to the destination UE. In some cases, in order to enhance reliability, a source UE communication may be relayed through multiple relay UEs, which may provide diversity gain and power gain relative to a single relay UE, with increased reliability and coverage of the relay link.

In accordance with various aspects of the present disclosure, a source UE may perform resource selection and reservation for cooperative relays. In some cases, a source UE may select a first set of resources for a source UE communication that is transmitted in a groupcast communication to a set of relay UEs, and a second set of resources for cooperative MIMO transmission by the set or relay UEs to the destination UE. Thus, first hop communications may be between the source UE and the set of relay UEs, and second hop communications may be between the relay UEs and the destination UE. In some cases, the source UE may transmit signaling that indicates the resource reservation. Such signaling may include, for example, a sidelink control information (SCI) transmissions that provides an indication of first hop and second hop resources, a medium access control (MAC) control element (CE) that provides the indication of the first hop and the second hop resources, or any combinations thereof.

In some cases, the resource reservations may be aperiodic resource reservations in which resources for a single instance of the first hop source UE communication and second hop relayed communication are provided in a resource reservation message. In some cases, in the event that the relay UEs do not provide an acknowledgment (ACK) of the first hop source UE communication (e.g., a negative acknowledgment (NACK) or no feedback is provided), the source UE may initiate a retransmission using the second set of resources, and the source UE can indicate a third set of resources for the second hop communication from the relay UEs to the destination UE. In the event of a NACK is received at the relay UEs from the destination UE, each relay UE may select retransmission resources (e.g., when asynchronized cooperative MIMO is used), or the destination UE may select retransmission resources (e.g., when synchronized cooperative MIMO is used).

In other cases, periodic resource reservation may be used in which the first and second sets of resources may provide multiple periodic resources for multiple instances of the source UE communication and the relayed communication. Acknowledgment feedback in such cases may include block ACK/NACK feedback based on the multiple instances of the communications. In the event of a NACK of the source UE communication to the relay UEs, the source UE may re-start the resource reservation procedure. In the event of a NACK of the relayed communications by the destination UE, the destination UE may provide retransmission resources to the relay UEs.

In the event of a collision of reserved resources of different source UEs, a priority associated with the communications may be used to determine which source UE has priority. In the event the different source UEs have a same priority for communications, a first or last reservation in time may be used to determine which source UE has priority. In some cases, a first source UE may receive an indication from a second source UE that indicates colliding resources for a groupcast transmission or for a cooperative MIMO transmission. In some cases, such a resource reservation may be received before a first hop groupcast transmission occurs from the source UEs, and in the event that the first source UE has a lower priority communication than the second source UE, the communication of the first source UE may be pre-empted by the second source UE. In cases where the first hop groupcast transmission has already occurred and a second hop cooperative MIMO resources for different source UEs collide, the relay UEs may pre-empt the lower priority communication and transmit the higher priority communication. In some cases, in the event the different source UEs have a same priority for communications, a first or last reservation in time may be used to determine which source UE has priority.

In some cases the source UE may transmit a source UE communication, using groupcast sidelink transmissions, to the set of one or more relay UEs. The set of relay UEs may transmit the source UE communication to the destination UE using cooperative multiple-input multiple-output (MIMO) transmissions. In some cases, the source UE may reserve resources for the groupcast sidelink transmissions for the first hop transmissions, and may reserve resources for the cooperative MIMO transmissions for the second hop transmissions. The source UE may transmit a resource reservation message with an indication of the reserved resources (e.g., in SCI or in a MAC-CE).

Aspects of the disclosure are initially described in the context of wireless communications systems. Various examples of reserved resources and relay techniques are then discussed. Aspects of the disclosure are further illustrated by and described with reference to apparatus diagrams, system diagrams, and flowcharts that relate to resource selection and reservation for cooperative relay in sidelink networks.

FIG. 1 illustrates an example of a wireless communications system 100 that supports resource selection and reservation for cooperative relay in sidelink networks in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a number of UEs 115 may communicate via sidelink communications, and may use relay techniques to enhance reliability of sidelink communications between a source and a destination. In some cases a source (e.g., a UE 115 that originates a sidelink communication) may transmit a source communication, using groupcast sidelink transmissions, to a set of one or more relays (e.g., one or more UEs 115 configured for sidelink communications that may relay transmissions between a source and destination). The set of relays may transmit the source communication to the destination (e.g., a UE 115 that receives the source communication) using cooperative MIMO transmissions. In some cases, the source may reserve resources for the groupcast sidelink transmissions and the cooperative MIMO transmissions, and may transmit a resource reservation message with an indication of the reserved resources. In some cases, the resource reservation message may be transmitted in a SCI transmission, in a MAC-CE, or any combinations thereof. In some cases, in the event of a collision in reserved resources of multiple different sources, the sources or relays may determine a priority of each communication and transmit a selected communication based on the priority determination.

Figure 2:
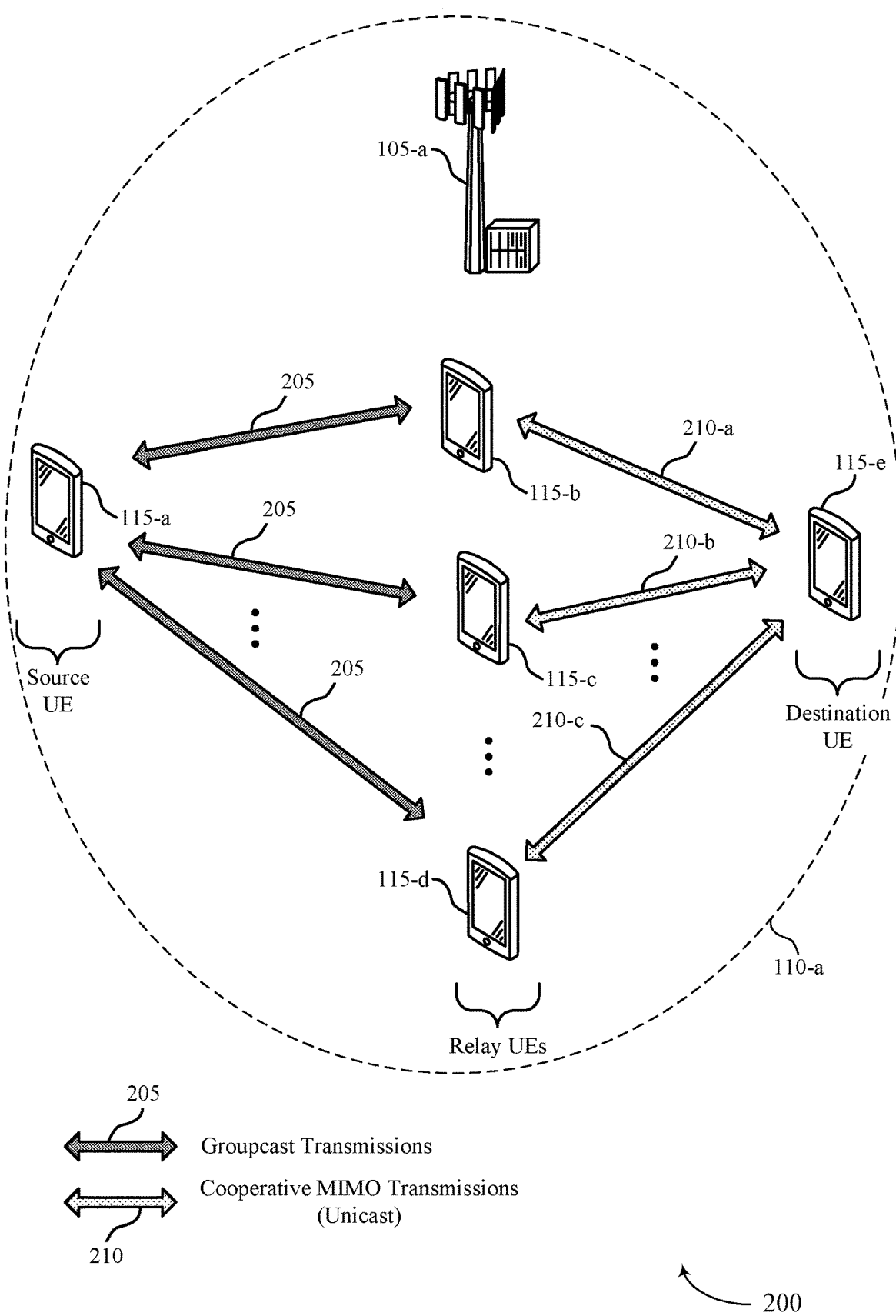
FIG. 2 illustrates an example of a portion of a wireless communications system that supports resource selection and reservation for cooperative relay in sidelink networks in accordance with aspects of the present disclosure.

FIG. 2 illustrates an example of a wireless communications system 200 that supports resource selection and reservation for cooperative relay in sidelink networks in accordance with aspects of the present disclosure. In some examples, wireless communications system 200 may implement aspects of wireless communications system 100. Wireless communications system 200 may include a base station 105-a (e.g., a base station 105 of FIG. 1) that may communicate with a number of UEs 115 (e.g., UEs 115 of FIG. 1) within coverage area 110-a. In some cases, the base station 105-a may configure resources for sidelink communications between the UEs 115, and the UEs 115 may communicate using the sidelink resources directly without the communications being transmitted to the base station 105-a.

In this example, UEs 115 in sidelink communications may use relaying techniques to enhance the reliability of communications. For example, a source UE 115-a may transmit a source UE communication to a destination UE 115-a via a number of relay UEs 115-b through 115-d. In such relay communications, the source UE 115-a may transmit a groupcast transmission 205 to a set of neighboring relay UEs 115-b through 115-d. For example, the groupcast transmission 205 may be transmitted to a first relay UE 115-b, a second relay UE 115-b, and an $n^{th}$ relay UE 115-d. The relay UEs 115-b through 115-d may then perform cooperative MIMO and transmit cooperative MIMO transmissions 210 to relay the source UE communication to the destination UE 115-e. In cases where the relay UEs 115-b through 115-d perform synchronized cooperative MIMO, the cooperative MIMO transmissions 210 may use a same set of uplink resources and may indicate a virtual UE identification. In cases where the relay UEs 115-b through 115-d perform asynchronized cooperative MIMO, the cooperative MIMO transmissions 210 may use separate uplink resources and a UE identification associated with each relay UE 115-b through 115-d.

In the example of FIG. 2, the first relay UE 115-b may transmit a first cooperative MIMO transmission 210-a, the second relay UE 115-c may transmit a second cooperative MIMO transmission 210-b, and so on, through the $n^{th}$ UE 115-d that transmits an $n^{th}$ cooperative MIMO transmission 210-c. While three relay UEs 115-b through 115-d are illustrated in FIG. 2, any number of one or more relay UEs 115 may use techniques as discussed herein. Using multiple relay UEs 115 may provide enhancements over a single relay UE in some cases, such as by providing enhanced diversity gain and power gain, as compared to a single relay, with increased reliability and coverage of the relay link. Additionally, while the example of FIG. 2 illustrates the destination as a destination UE 115-e, in other cases the destination may be base station 105-a, and relay techniques as discussed herein may provide improved uplink coverage in cases where channel conditions between the base station 105-*a* and the source UE 115-*a* may be relatively poor.

In some cases, the source UE 115-*a* may select resources for both the first hop groupcast transmissions 205 and the second hop cooperative MIMO transmissions 210. Such resource selection may be based on a pool of sidelink resources that are configured by the base station 105-*a*, for example. In some cases, the base station 105-*a* may enable sidelink relaying (e.g., when measured channel conditions indicate that relayed communications may enhance reliability) when configuring or reconfiguring sidelink resources. In some cases, the source UE 115-*a* may configure the selected first hop resources for sidelink groupcast communications, and may provide a time and frequency resource allocation for the relay UEs 115-*b* through 115-*d* for the groupcast transmissions 215. Further, the source UE 115-*a* may select second hop resources for cooperative MIMO transmissions 210 for the relay UEs 115-*b* through 115-*d* to transmit the source UE communication to the destination UE 115-*d*. The resource allocations provided by the source UE 115-*a* may include, for example, one or more slots for the groupcast transmissions 205 and the cooperative MIMO transmissions 210. Within a given slot, the resource allocation may provide one or more OFDM symbols, one or more resource blocks (RBs), or any combinations thereof. In some cases, the resource allocation information may be provided by the source UE 115-*a* using second stage SCI, using a MAC-CE, or any combinations thereof. In cases where synchronized cooperative relay is used for the cooperative MIMO transmissions 210, a common virtual relay ID for the relay link may be included in the SCI or the MAC-CE of the PSSCH of the groupcast transmissions 205.

For the cooperative MIMO transmissions 210, in cases where synchronized cooperative relay MIMO techniques are used, each relay UE 115-*b* through 115-*d* may transmit the source UE communication to the destination UE 115-*e* in a same slot and in a same time/frequency resource. The destination UE 115-*e* may treat the relayed communication as being from a virtual single relay and receive the relayed communication only once. In cases where asynchronized cooperative relay techniques are used, the relay UEs 115-*b* through 115-*d* may transmit the source UE communication to the destination UE 115-*e* in different slot/time/frequency resources, and an actual physical relay ID may be used for each corresponding cooperative MMO transmission 210-*a* through 210-*c*. In such asynchronized cooperative relay cases, the destination UE 115-*e* may need to receive the relayed communication multiple times, one from each relay. In some cases, one or more of the relay UEs 115-*b* through 115-*d* may forward the full resource allocation (including allocation for all relays) to the destination UE 115-*e* so that the destination UE 115-3 can combine the log likelihood ratios (LLRs) of the source communication from all the relays. In some cases, the first hop resources reserved for the groupcast transmissions 205 may be aperiodic resources in which a single instance of the source communication is relayed to the destination UE 115-*e*. Examples of relay techniques using such aperiodic resources are discussed with reference to FIGS. 3 and 4. In other cases, the first hop resources and the second hop resources may include periodic resources in which multiple instances of the source communication are transmitted, and examples of such techniques are discussed with reference to FIGS. 5 and 6. In the event of a collision in reserved resources of different sources, collision resolution techniques may be used to determine which source is to have priority, as discussed with reference to examples of FIGS. 7 and 8.

Figure 3:
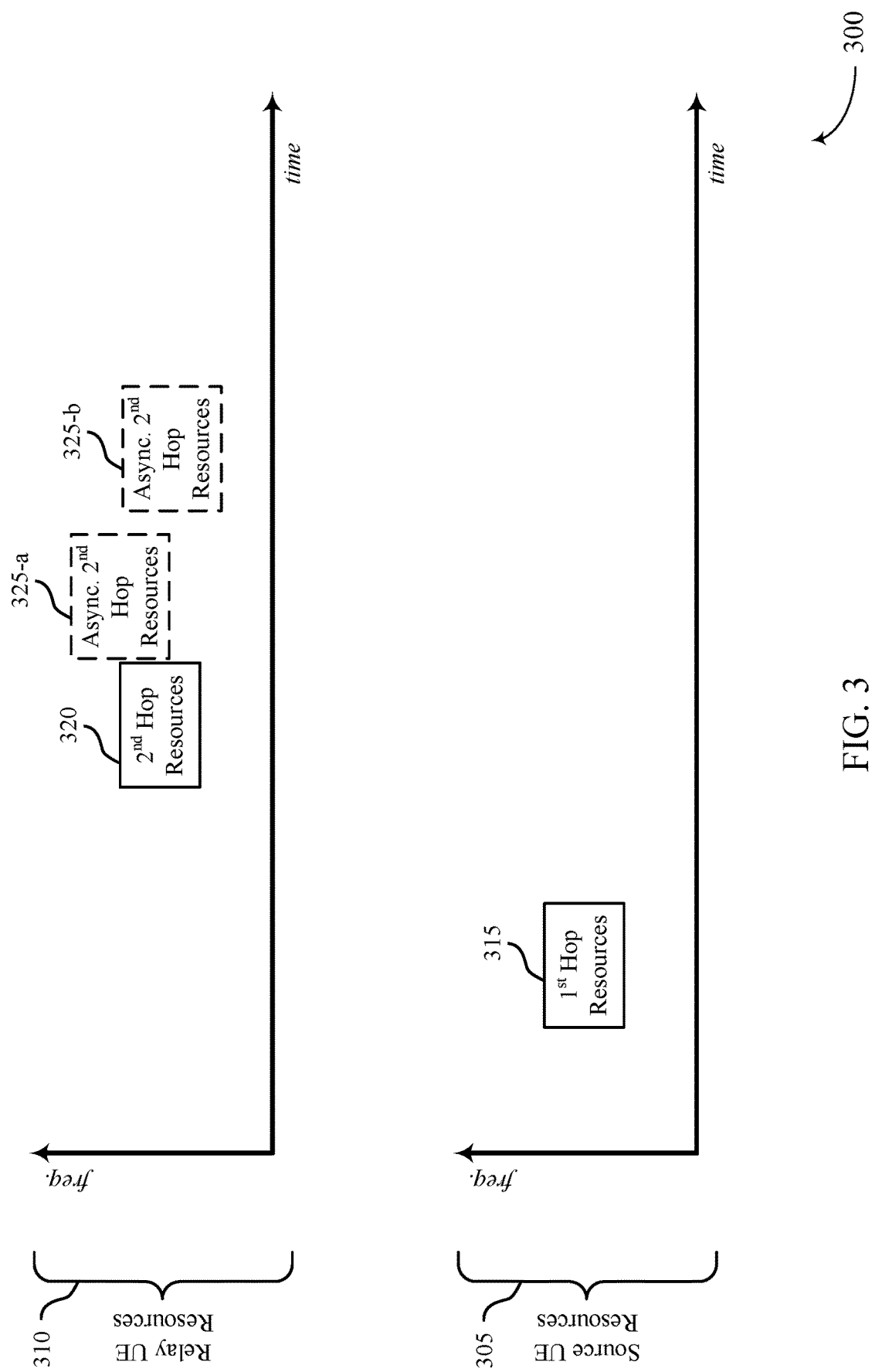
FIG. 3 illustrates an example of source UE and relay UE resources for cooperative relay in sidelink networks in accordance with aspects of the present disclosure.

FIG. 3 illustrates an example of a source UE and relay UE resources 300 for cooperative relay in sidelink networks in accordance with aspects of the present disclosure. In some examples, resources 300 may be used for relayed communications in aspects of wireless communications system 100 or 200.

In this example, a source UE may reserve source UE resources 305, which may include aperiodic first hop resources 315. The source UE may also reserve relay UE resources 310, which may include aperiodic second hop resources 320. In cases where the relay UEs use synchronized cooperative MIMO, each relay UE may use the same second hop resources 320, and in cases where the relay UEs use asynchronized cooperative MIMO, separate second hop resources 325 may be provided for different relay UEs (e.g., first asynchronous second hop resources 325-*a* for a first relay UE and second asynchronous second hop resources 325-*b* for a second relay UE). In some cases, the relay UE resources 310 may be passed to the relay UEs via SCI (e.g., second stage SCI), in a MAC-CE in PSSCH in the first hop transmission, or any combinations thereof. If a relay UE decodes the first hop transmission in the first hop resources 315, it may use the reserved second hop resources 320 or 325 for the second hop transmission, and transmit an acknowledgment (e.g., a HARQ ACK indication) to the source UE. In the event that each relay UE fails to decode the groupcast first hop transmission, an ACK may not be provided, and the source UE may initiate one or more retransmissions of the source UE communication, as illustrated in FIG. 4.

Figure 4:
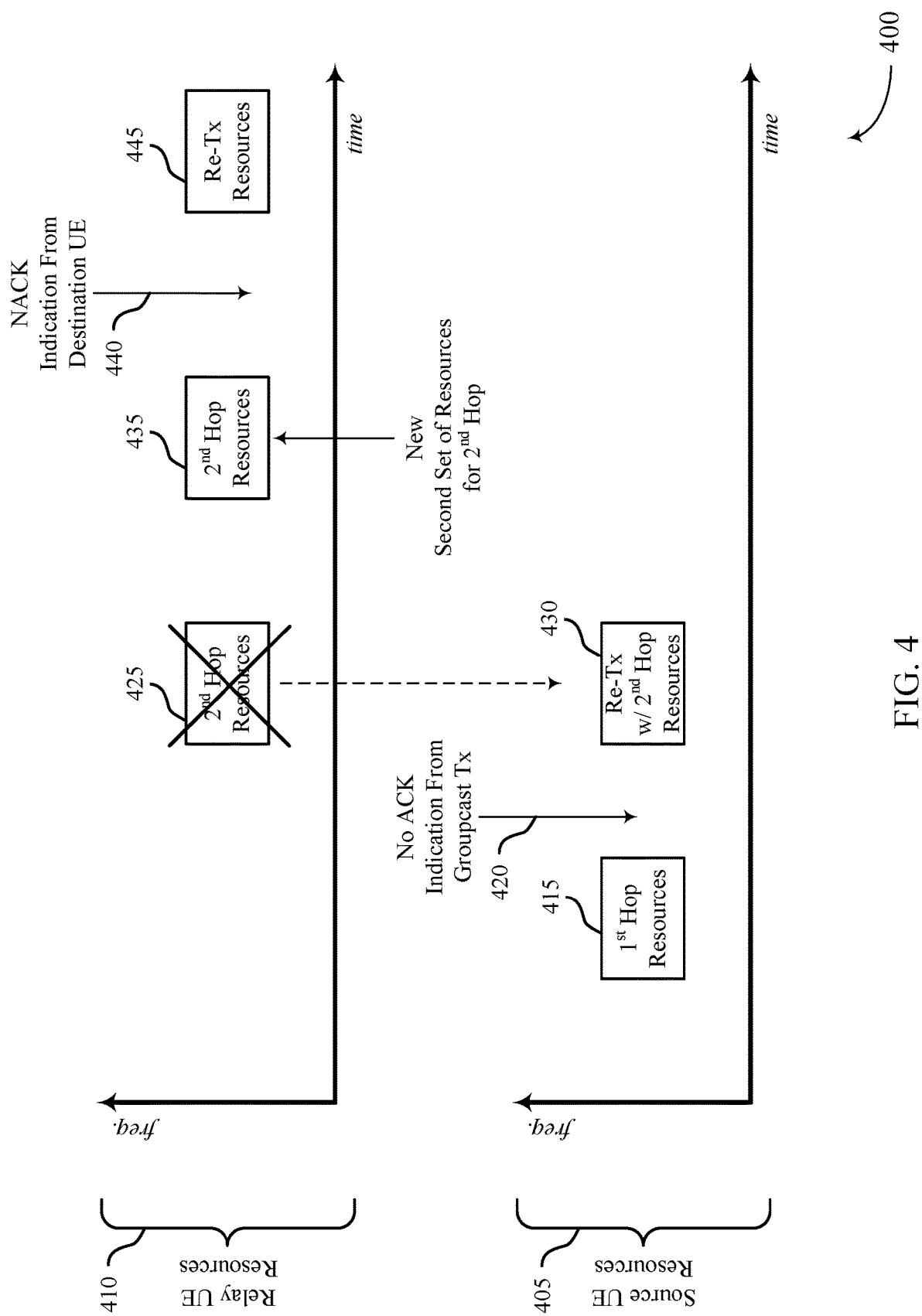
FIG. 4 illustrates an example of source UE retransmissions for cooperative relay in sidelink networks in accordance with aspects of the present disclosure.

FIG. 4 illustrates an example of a source UE retransmissions 400 for cooperative relay in sidelink networks in accordance with aspects of the present disclosure. In some examples, retransmissions 400 may be used for relayed communications in aspects of wireless communications system 100 or 200.

In this example, similarly as discussed with reference to FIG. 3, a source UE may reserve source UE resources 405, which may include aperiodic first hop resources 415. The source UE may also reserve relay UE resources 410, which may include aperiodic second hop resources 425. As discussed herein, the relay UE resources 410 may be passed to the relay UEs via SCI (e.g., second stage SCI), in a MAC-CE in PSSCH in the first hop transmission, or any combinations thereof. In the event that the relay UEs fail to decode the first hop transmission in the first hop resources 415, an associated ACK may not be received at the source UE, as indicated at 420. In some cases, the source UE may receive a NACK indication from one or more of the relay UEs. In other cases, the source UE may not receive any indication from the relay UEs, or may receive one or more NACK indications from a subset of the relay UEs and no indication from other of the relay UEs.

In some cases, ACK/NACK feedback for the groupcast transmission of the first hop may be considered to be a NACK in the event that one or more of the relay UEs transmit a NACK indication. In other cases, ACK/NACK feedback for the groupcast transmission of the first hop may be considered to be an ACK in the event that one or more of the relay UEs transmit an ACK indication. In still other cases, ACK/NACK feedback for the groupcast transmission of the first hop may be considered to be an ACK only when two or more relay UEs transmit an ACK indication.

In the example of FIG. 4, in which an ACK is not received for the first hop transmission in the first hop resources 415, the second hop resources 425 may be used by the source UE as retransmission resources 430 for a retransmission of the source UE communication. The source UE may also reserve a different second hop resource 435 (e.g., the source UE may perform channel sensing and reservation for further resources to be used by the relay UEs for the second hop transmissions). The procedure may continue until a ACK received at the source UE. In cases where asynchronized cooperative relays are used, the source UE may use a first second hop resource in time from a previously reserved plurality of second hop resources for the retransmission of the first hop.

In cases where the relay UEs successfully receive the first hop transmission or retransmission, an ACK may be provided to the source UE, and the relay UEs may use the indicated second hop resources for the second hop cooperative MIMO transmissions. In the example of FIG. 4, the relay UEs may receive a NACK 440 from the destination UE (or other destination node, such as a base station). In cases where the second hop transmissions use synchronized cooperative MIMO, the destination node may reserve a common retransmission resource 445 for synchronized retransmission (e.g., the destination may groupcast the common retransmission resources 445 to all the relays). In cases where the second hop transmission use asynchronized cooperative MIMO, each relay may separately reserve retransmission resources 445 following a nominal resource reservation procedure.

Figure 5:
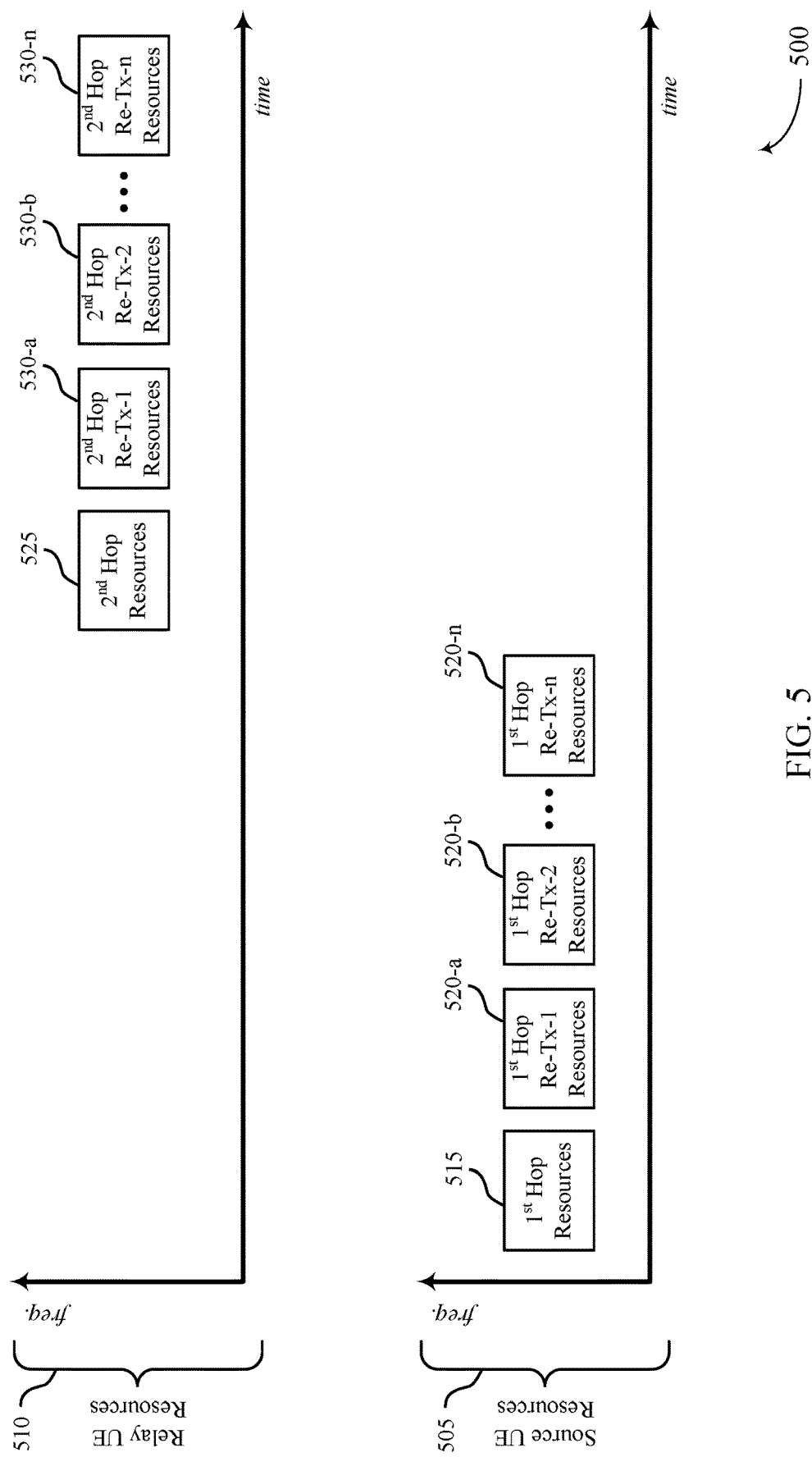
FIG. 5 illustrates an example of periodic scheduled resources for cooperative relay in sidelink networks in accordance with aspects of the present disclosure.

FIG. 5 illustrates an example of periodic scheduled resources 500 for cooperative relay in sidelink networks in accordance with aspects of the present disclosure. In some examples, resources 500 may be used for relayed communications in aspects of wireless communications system 100 or 200.

In this example, a source UE may reserve source UE resources 505, which may include periodic resources that include first hop resources 515 and multiple first hop retransmission resources 520 (e.g., including first retransmission resources 520-*a*, second retransmission resources 520-*b*, through nth retransmission resource 520-*n*). The source UE may also reserve periodic relay UE resources 510, which may include second hop resources 525 and multiple second hop retransmission resources 530 (e.g., including first retransmission resources 530-*a*, second retransmission resources 530-*b*, through nth retransmission resource 530-*n*). For example, the source UE may assume X first hop resources based on the initial transmission of a transport block and n instances of retransmissions of the transport block (i.e., X=n+1), and may reserve 2X orthogonal resources (e.g., a semi-persistent scheduling type reservation that is performed per source ID), where X resources are used for the first hop and another X resources are for the second hop. The reservation may be per source ID, which may allow multiple source UEs to share a same relay.

In cases where the relay UEs use synchronized cooperative MIMO, each relay UE may use the same second hop resources 525 and second hop retransmission resources 530, and in cases where the relay UEs use asynchronized cooperative MIMO, separate resources may be provided for different relay UEs. In some cases, the relay UE resources 510 may be passed to the relay UEs via SCI (e.g., second stage SCI), in a MAC-CE in PSSCH in the first hop transmissions, or any combinations thereof. If a relay UE decodes the first hop transmissions in the first hop resources 515 and 520, it may use the reserved second hop resources 525 and 530 for the second hop transmissions, and transmit an acknowledgment (e.g., a HARQ ACK indication) to the source UE. In the event that the relay UEs fail to decode the groupcast first hop transmission, an ACK may not be provided, and the source UE may initiate one or more retransmissions of the source UE communication, as illustrated in FIG. 6.

Figure 6:
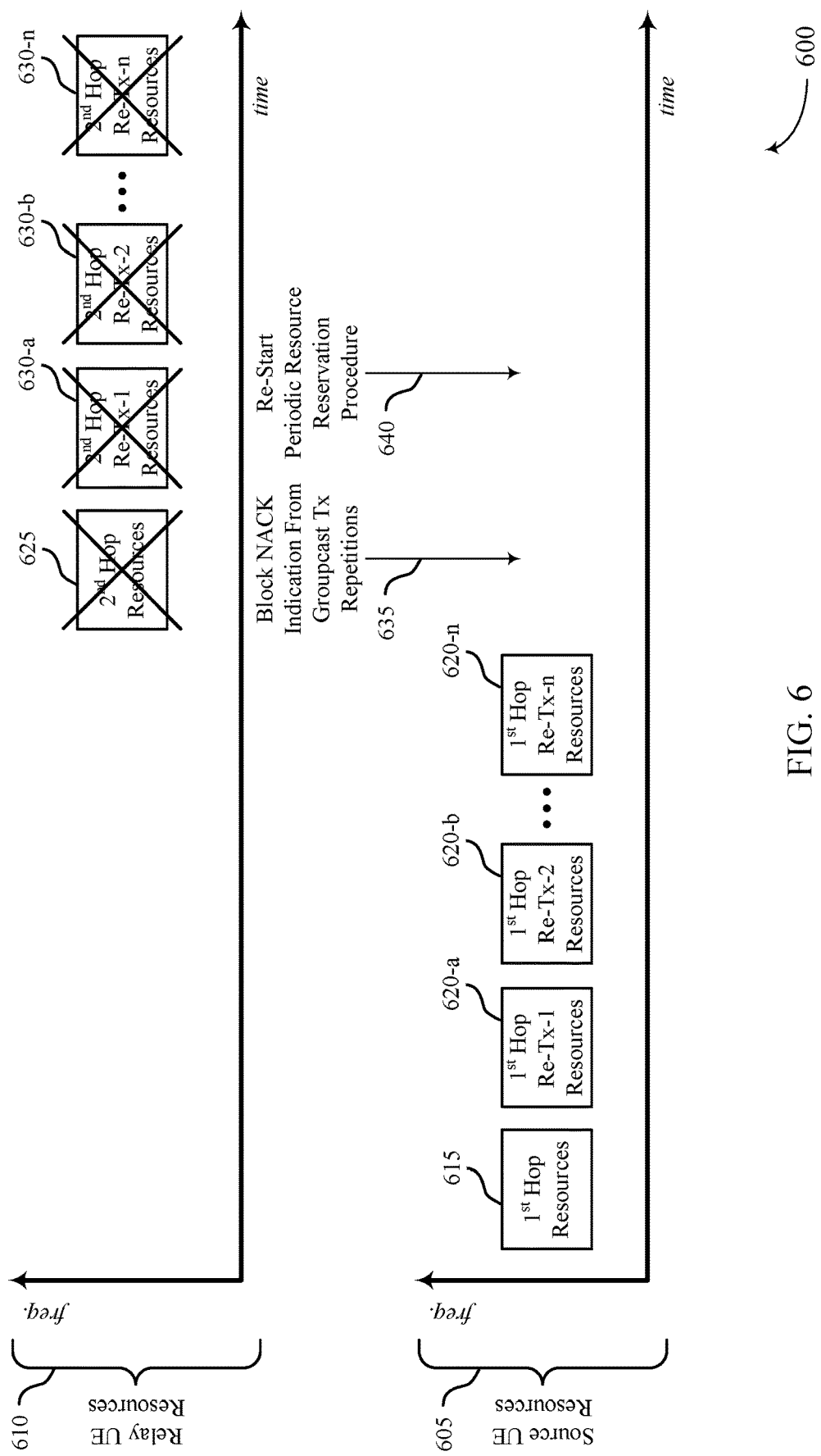
FIG. 6 illustrates an example of source UE retransmissions using periodic scheduled resources for cooperative relay in sidelink networks in accordance with aspects of the present disclosure.

FIG. 6 illustrates an example of a source UE retransmissions using periodic scheduled resources 600 for cooperative relay in sidelink networks in accordance with aspects of the present disclosure. In some examples, resources 600 may be used for relayed communications in aspects of wireless communications system 100 or 200.

In this example, similarly as in FIG. 5, a source UE may reserve source UE resources 605, which may include periodic resources that include first hop resources 615 and multiple first hop retransmission resources 620 (e.g., including first retransmission resources 620-*a*, second retransmission resources 620-*b*, through nth retransmission resource 620-*n*). The source UE may also reserve periodic relay UE resources 610, which may include second hop resources 625 and multiple second hop retransmission resources 630 (e.g., including first retransmission resources 630-*a*, second retransmission resources 630-*b*, through nth retransmission resource 630-*n*).

In this example, the relay UEs may not successfully decode the first hop transmissions, and may transmit a NACK 635 to the source UE. The source UE may then restart the periodic resource reservation procedure as indicated at 640, to reserve periodic sidelink resource for both the first and second hop transmissions. In some cases, the feedback from the relay UEs may be block-based HARQ ACK/NACK feedback for the periodic (e.g., SPS) resource reservation, such that no individual HARQ feedback is provided for individual transmissions in the reserved set of resources. In such examples, the source UE may blindly transmit the source UE communication along with n retransmissions using X reserved resources. The relay UEs than transmit HARQ feedback after monitoring and attempting to decode the X periodic resources. For the first hop, if NACK is received at the source UE after sending X instances of the source UE communication, the source UE may restart the block resource reservation procedure to reserve another set of X resources and use it for first hop retransmissions. For the second hop, if decoding fails at the destination node after combining received signals on X relay UE resources 610, the destination node may start the block resource reservation procedure to reserve a set of X resources and use it for second hop retransmissions.

Figure 7:
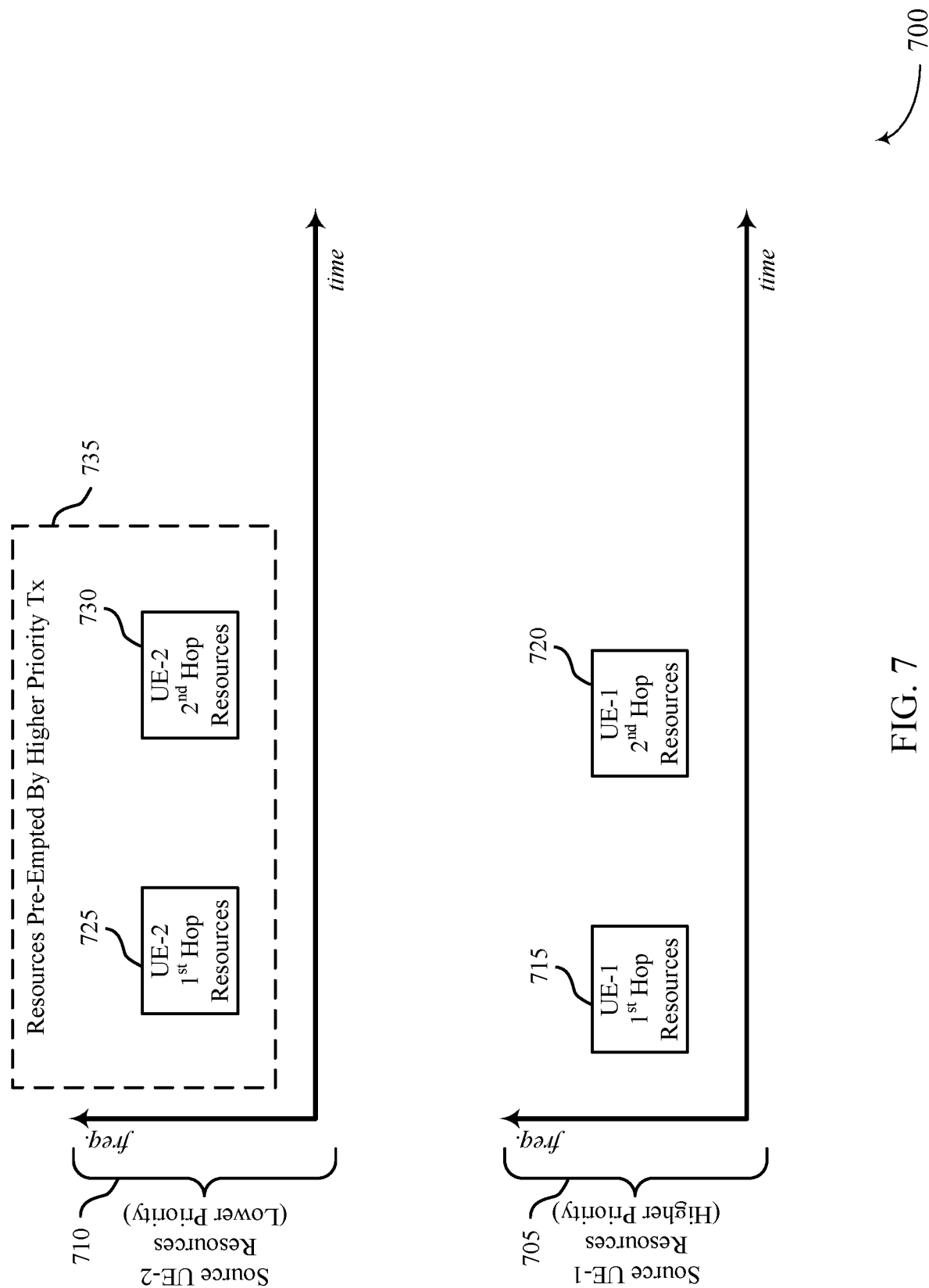
FIGS. 7 and 8 illustrate examples of collisions of reserved resources for cooperative relay in sidelink networks in accordance with aspects of the present disclosure.

FIG. 7 illustrates an example 700 of a collision of reserved resources for cooperative relay in sidelink networks in accordance with aspects of the present disclosure. In some examples, example 700 may be used for relayed communications in aspects of wireless communications system 100 or 200.

In this example, a first source UE may reserve first source UE resources 705, which may include first hop resources 715 for the first source UE and associated second hop resources 720 for use by relay UEs. Similarly, a second source UE may reserve second source UE resources 710 that include corresponding first hop resources 725 for the second source UE and associated second hop resources 730 for use by relay UEs. In this example, the first hop resources 715 for the first source UE may collide with first hop resources 725 for the second source UE. Additionally, or alternatively, the second hop resources 720 for the first source UE may collide with second hop resources 730 for the second source UE. In this example, the first source UE may transmit data having a higher priority than the second source UE. In such cases, the second source UE reserved resources 735 may be preempted by the first UE. In some cases, the priority associated with a communication may be determined based on one or more quality of service parameters associated with the reserved resources, a service type associated with the reserved resources, a priority indicator associated with the reserved resources, or any combinations thereof (e.g., a resource reservation message transmitted in SCI (e.g., first stage SCI (SCI-1)) or in a MAC-CE may indicate a priority associated with the data that is to be transmitted using the reserved resource).

In some cases, the resource reservation for the first source UE resources 705 and the second source UE resources 710 may be communicated before the first hop transmission of either source UE occurs. In such a case, a resource reserved with lower priority can be pre-empty by higher priority reservation, and the source UE with the lower priority reservation may defer its transmission to allow the other source UE to transmit. In some cases, the priority associated with each resource reservation may be determined in a manner that is similar to established V2X priority based resource reservation overriding procedures. In some cases, resources associated with second hop transmissions may collide, and the relay UEs may determine which transmission is to be sent. An example of such a collision is discussed with reference to FIG. 8.

Figure 8:
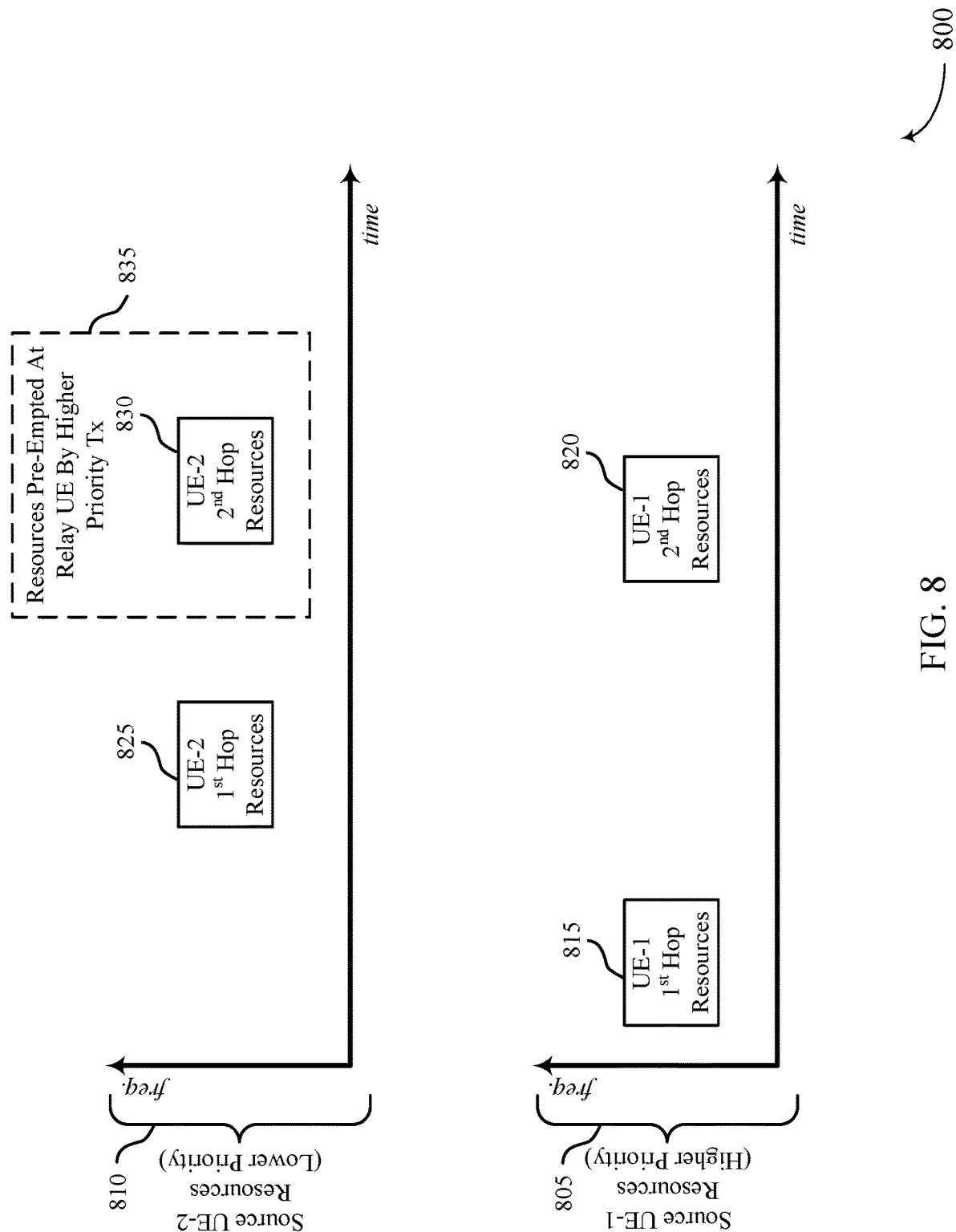

FIG. 8 illustrates an example 800 of a collision of reserved resources for cooperative relay in sidelink networks in accordance with aspects of the present disclosure. In some examples, example 800 may be used for relayed communications in aspects of wireless communications system 100 or 200.

In this example, a first source UE may reserve first source UE resources 805, which may include first hop resources 815 for the first source UE and associated second hop resources 820 for use by relay UEs. Similarly, a second source UE may reserve second source UE resources 810 that include corresponding first hop resources 825 for the second source UE and associated second hop resources 830 for use by relay UEs. In this example, a relay UE (or other relay node) may act as a relay for multiple source nodes, and the second hop resources 820 for the first source UE may collide with second hop resources 830 for the second source UE after the first hop transmission of each source UE occurs. In such a case, the relay UEs may prioritize the higher priority transmission, based on priority indicated in SCI or based on assuming a later transmission in time has higher priority, and the relay UEs may preempt lower priority resources 835, and transmit the higher priority communication.

Figure 9:
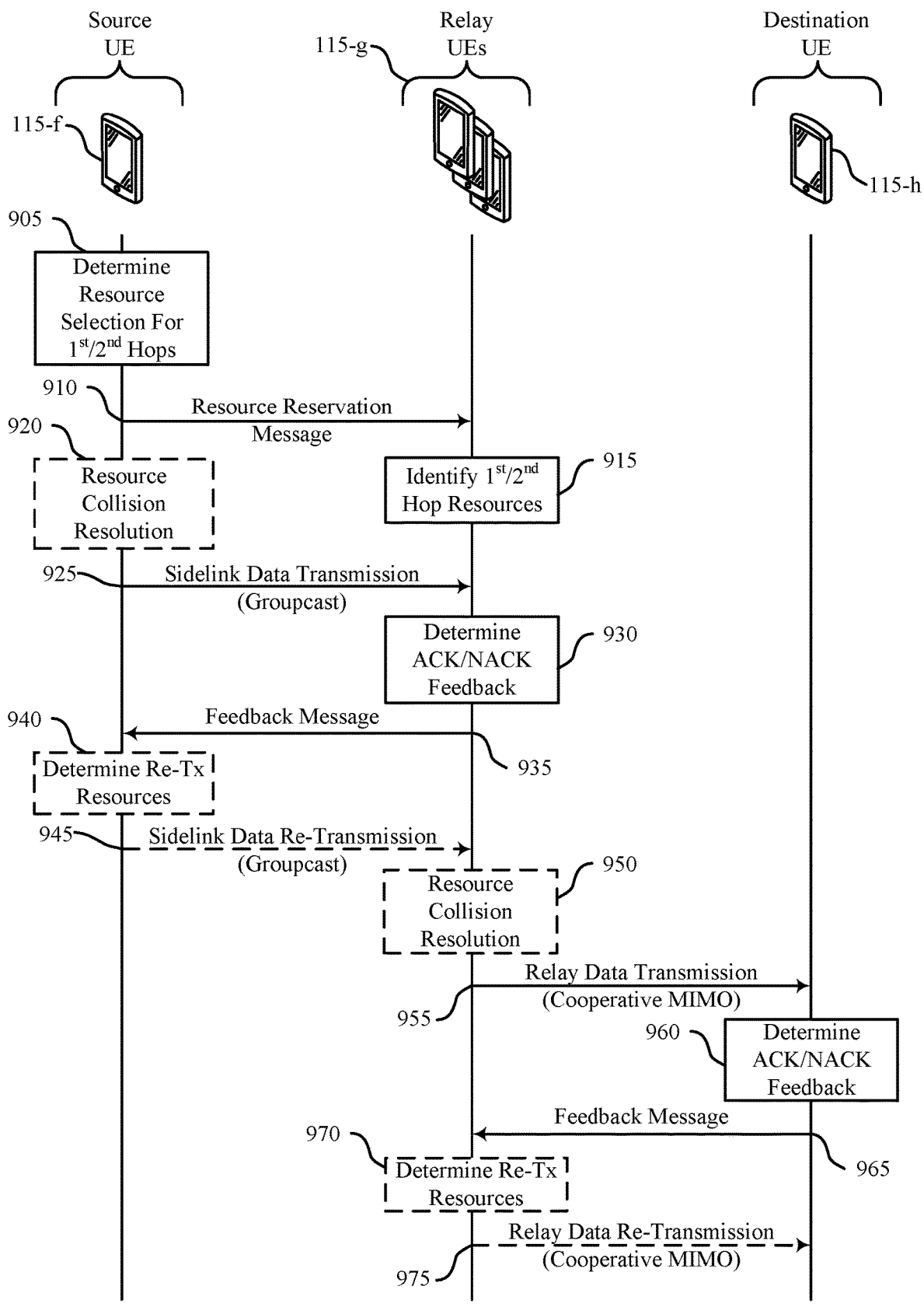
FIG. 9 illustrates an example of a process flow that supports resource selection and reservation for cooperative relay in sidelink networks in accordance with aspects of the present disclosure.

FIG. 9 illustrates an example of a process flow 900 that supports resource selection and reservation for cooperative relay in sidelink networks in accordance with aspects of the present disclosure. Process flow 900 may include a source UE 115-f, multiple relay UEs 115-g, and a destination UE 115-h, which may be examples of UEs as described herein. As described herein, source UE 115f, relay UEs 115-g, and destination UE 115-h may communicate over a sidelink channel. While UEs 115 are illustrated and discussed with reference to various aspects of the present disclosure, it is to be understood that other types of wireless nodes may act as the source, relay, and destination, and the techniques discussed herein apply to any such wireless nodes that may perform relayed communications via multiple relay nodes.

In the following description of the process flow 900, the operations between source UE 115-f, relay UEs 115-g, and destination UE 115-h, may be transmitted in a different order than the exemplary order shown, or the operations performed by the UEs 115 may be performed in different orders or at different times. Certain operations may also be left out of the process flow 900, or other operations may be added to the process flow 900. It is to be understood that while UEs 115 are shown performing a number of the operations of process flow 900, any wireless device may perform the operations shown.

At 905, the source UE 115-f may determine resources for first hop and second hop relayed communications with destination UE 115-h via a sidelink channel. In some cases, source UE 115-f may perform channel sensing and resource reservation in accordance with established sidelink (e.g., PC5) procedures. In some cases, the resources may be aperiodic resources in which a single first hop resource and a single second hop resource are selected. In other cases, the resources may be periodic or SPS type resources in which multiple first hop resources and multiple second hop resources are selected.

At 910, the source UE 115-f may transmit a resource reservation message to the relay UEs 115-g. In some cases, the resource reservation message may indicate the second hop resources that have been reserved for the second hop cooperative MIMO transmissions from the relay UEs 115-g to the destination UE 115-h. In some cases, the resource reservation message may be transmitted in SCI (e.g., in second stage SCI transmitted from the source UE 115-f to the relay UEs 115-g), may be transmitted in a MAC-CE (e.g., in a MAC-CE that is transmitted in a PSSCH transmission with the first hop transmission(s)), or any combinations thereof.

At 915, the relay UEs 115-g may identify the first hop and second hop resources. In some cases, the reserved resources may be identified based on information in the resource reservation message. In some cases, the first hop resources may be identified based on the resource reservation message in an SCI transmission that indicates the first hop resources, and the second hop resources may be identified based on a MAC-CE that is transmitted with the first hop transmission(s). In other cases, both the first hop resources and the second hop resources may be indicated in one or more SCI transmissions.

Optionally, at 920, the source UE 115-f may perform a resource collision resolution. In some cases, the source UE 115-f may monitor for resource reservation messages of other source UEs, and in the event that there is a collision in reserved resources, the source UE 115-f may determine to transmit its first hop transmission or preempt its first hop transmission based on a priority associated with the reserved resources. In some cases, if the priority associated with each of the reserved resources are equal, the determination to transmit or preempt may be based on a timing of the resource reservations of the different source UEs (e.g., a latest or earliest resource reservation in time has priority).

At 925, the source UE 115-f may transmit the source UE communication in a sidelink data transmission to the relay UEs 115-g. In some cases, the source UE 115-f may transmit the source UE communication in a groupcast transmission to the relay UEs 115-g. In cases where aperiodic reservations are used, a single instance of the source UE communication may be transmitted. In cases where periodic reservations are used, multiple instances of the source UE communication may be transmitted in accordance with multiple periodic reserved resources for the first hop transmissions.

At 930, the relay UEs 115-g may determine ACK/NACK feedback associated with the source UE communication. In some cases, the ACK/NACK feedback may be determined in accordance with groupcast HARQ ACK/NACK feedback techniques (e.g., NACK is reported if none of the relay UEs 115-g successfully decode the source UE communication, or if one or more of the relay UEs 115-g do not successfully decode the source UE communication). At 935, the feedback message may be transmitted to the source UE 115-f (e.g., in a physical sidelink feedback channel (PSFCH) communication to the source UE 115-f).

Optionally, at 940, the source UE 115-f may determine retransmission resources in the event that the feedback message indicates a NACK or in the event that no feedback message is received. In some cases, the retransmission resources may be the second hop resources that were previously reserved by the source UE 115-f In such cases, the source UE 115-f may select additional resources as the second hop resources. At 945, in cases where a retransmission of the source UE communication is indicates, the source UE 115-f may retransmit the sidelink data to the relay UEs 115-g, using a groupcast communication, which may be received at the relay UEs 115-g.

Optionally, at 950, the relay UEs 115-g may perform resource collision resolution. In some cases, the relay UEs 115-g may act as relays to more than one source UE, and a different source may provide an indication of reserved resources that conflict with the reserved resources of the source UE 115-f In some cases, the collision resolution may be based on which of the sources has higher priority communications, which of the sources had a latest reservation of the reserved resources, or any combinations thereof.

At 955, the relay UEs 115-g may transmit the source UE communication to the destination UE 115-h. In some cases, the relay UEs 115-g may transmit using cooperative MIMO to the destination UE 115-h, which may provide enhanced likelihood of successful receipt of the relayed transmission. In some cases, the relay UEs 115-g may use synchronized cooperative MIMO and transmit the relayed communications using a same set of time and frequency resources, using a same virtual relay ID that may be provided by the source UE 115-f in the resource reservation message. In some cases, the relay UEs 115-g may use asynchronized cooperative MIMO using different resources and an actual physical relay ID that is associated with each particular relay UE 115-g.

At 960, the destination UE 115-h may monitor for the cooperative MIMO communications from the relay UEs 115-g, attempt to decode the source UE communication, and determine ACK/NACK feedback for the communication. At 965, the destination UE 115-h may transmit a feedback message (e.g., via a PSFCH transmission) to the relay UEs 115-g. In the event that the destination UE 115-h provides a NACK indication, the relay UEs 115-g may retransmit the source UE communication to the destination UE 115-h. Optionally, at 970, the relay UEs 115-g may determine retransmission resources for such a retransmission. In cases with synchronous cooperative MIMO, the retransmission resources may be selected by the destination UE 115-h and provided to the relay UEs 115-g. In cases with asynchronous cooperative MIMO each relay UE 115-g may determine its own retransmission resources. In the event of such retransmissions, at 975, the relay UEs 115-g may transmit the retransmissions to the destination UE 115-h using the determined retransmission resources. Such retransmissions may continue until successful decoding of the source UE communication at the destination UE 115-h.

Figure 10:
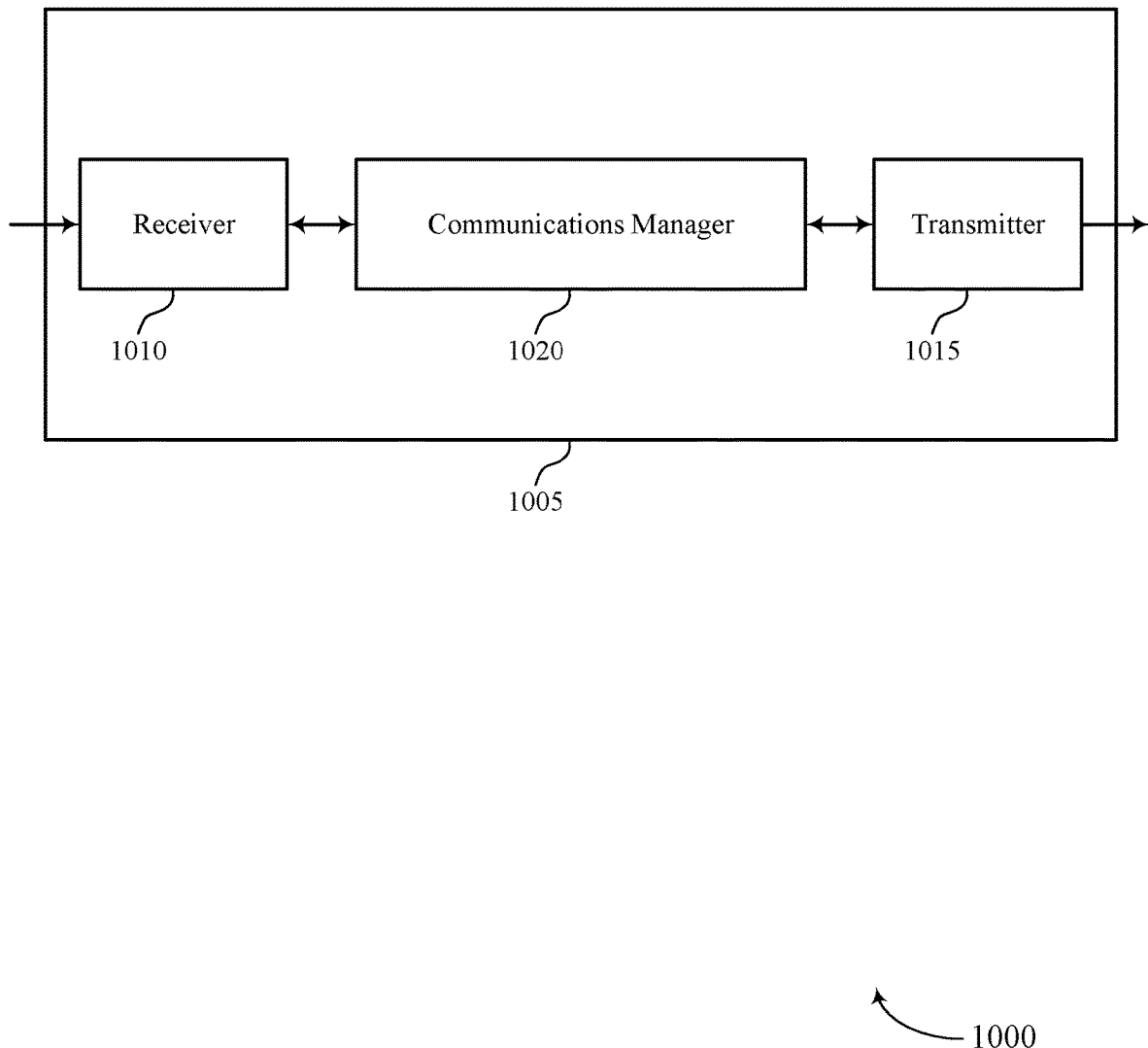
FIGS. 10 and 11 show block diagrams of devices that support resource selection and reservation for cooperative relay in sidelink networks in accordance with aspects of the present disclosure.

FIG. 10 shows a block diagram 1000 of a device 1005 that supports resource selection and reservation for cooperative relay in sidelink networks in accordance with aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to resource selection and reservation for cooperative relay in sidelink networks). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to resource selection and reservation for cooperative relay in sidelink networks). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of resource selection and reservation for cooperative relay in sidelink networks as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a source UE in accordance with examples as disclosed herein. For example, the communications manager 1020 may be configured as or otherwise support a means for transmitting, to a set of relay UEs, a resource reservation message that indicates a first set of resources for a source UE communication from the source UE to the set of relay UEs, and a second set of resources for one or more relay transmissions of the source UE communication from the set of relay UEs to a destination UE, where the first set of resources are groupcast sidelink resources for a groupcast sidelink communication from the source UE to the set of relay UEs, and the second set of resources are cooperative MIMO resources for cooperative MIMO sidelink communications from the set of relay UEs to the destination UE. The communications manager 1020 may be configured as or otherwise support a means for transmitting the source UE communication to the set of relay UEs in the groupcast sidelink communication using the first set of resources.

Additionally or alternatively, the communications manager 1020 may support wireless communication at a relay UE in accordance with examples as disclosed herein. For example, the communications manager 1020 may be configured as or otherwise support a means for receiving, from a source UE, a resource reservation message that indicates a first set of resources for a source UE communication from the source UE, and a second set of resources for one or more relay transmissions of the source UE communication to a destination UE, where the first set of resources are groupcast sidelink resources for a groupcast sidelink communication from the source UE to the relay UE, and the second set of resources are cooperative MIMO resources for cooperative MIMO sidelink communications between the relay UE and the destination UE. The communications manager 1020 may be configured as or otherwise support a means for monitoring the first set of resources for the source UE communication.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for cooperative relay of communications between a source and a destination via multiple relay UEs. Such techniques may enhance reliability of communications between the source and destination, which may provide diversity gain and power gain relative to a single relay UE, with increased reliability and coverage of the relay link. Further, such techniques may enhance efficiency by allowing a source UE to reserve resources for the relay UEs thus allowing the relay UEs to perform the relayed transmissions without coordination with other relay UEs.

Figure 11:
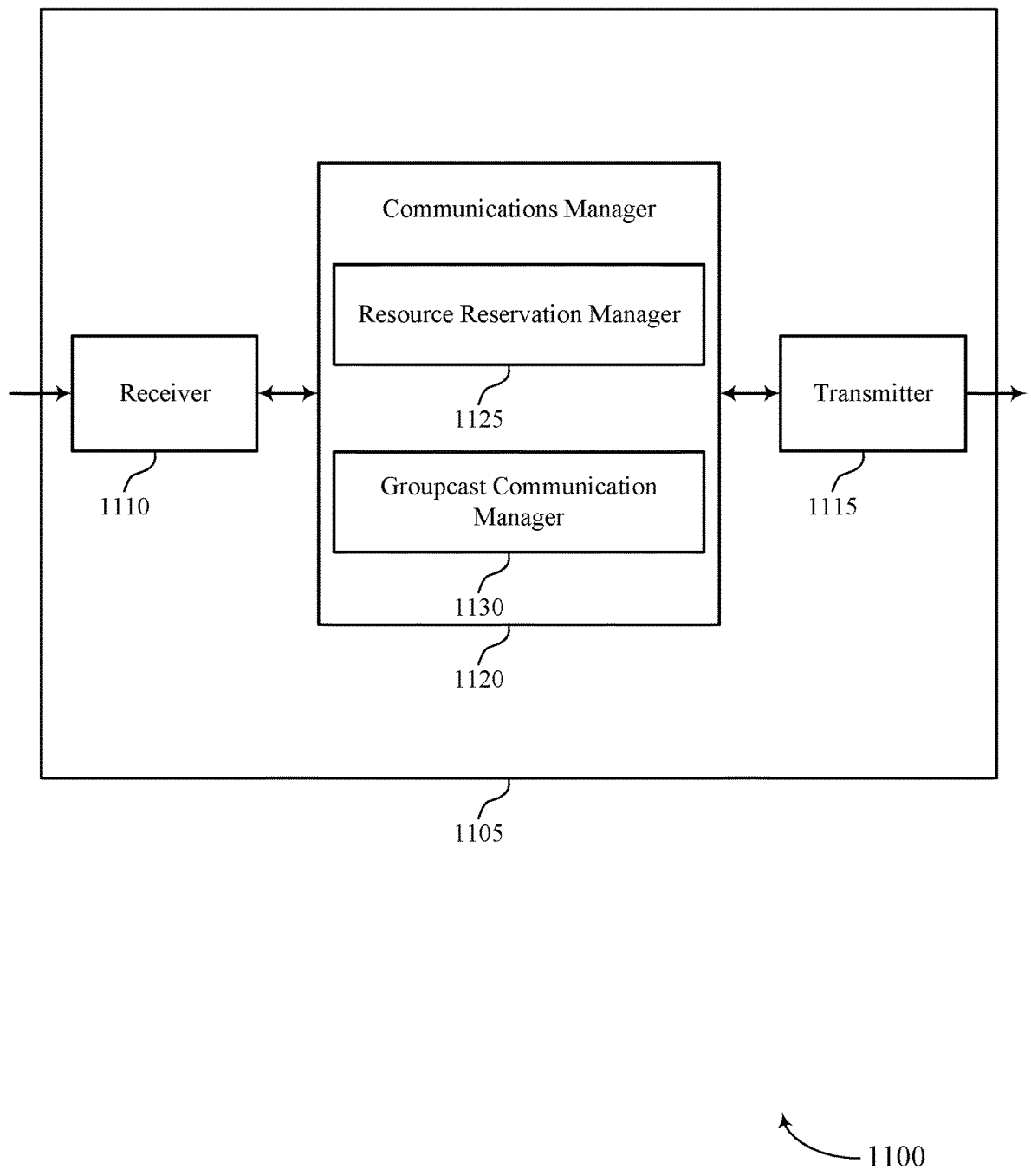

FIG. 11 shows a block diagram 1100 of a device 1105 that supports resource selection and reservation for cooperative relay in sidelink networks in accordance with aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to resource selection and reservation for cooperative relay in sidelink networks). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to resource selection and reservation for cooperative relay in sidelink networks). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of resource selection and reservation for cooperative relay in sidelink networks as described herein. For example, the communications manager 1120 may include a resource reservation manager 1125 a groupcast communication manager 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a source UE in accordance with examples as disclosed herein. The resource reservation manager 1125 may be configured as or otherwise support a means for transmitting, to a set of relay UEs, a resource reservation message that indicates a first set of resources for a source UE communication from the source UE to the set of relay UEs, and a second set of resources for one or more relay transmissions of the source UE communication from the set of relay UEs to a destination UE, where the first set of resources are groupcast sidelink resources for a groupcast sidelink communication from the source UE to the set of relay UEs, and the second set of resources are cooperative MIMO resources for cooperative MIMO sidelink communications from the set of relay UEs to the destination UE. The groupcast communication manager 1130 may be configured as or otherwise support a means for transmitting the source UE communication to the set of relay UEs in the groupcast sidelink communication using the first set of resources.

Additionally or alternatively, the communications manager 1120 may support wireless communication at a relay UE in accordance with examples as disclosed herein. The resource reservation manager 1125 may be configured as or otherwise support a means for receiving, from a source UE, a resource reservation message that indicates a first set of resources for a source UE communication from the source UE, and a second set of resources for one or more relay transmissions of the source UE communication to a destination UE, where the first set of resources are groupcast sidelink resources for a groupcast sidelink communication from the source UE to the relay UE, and the second set of resources are cooperative MIMO resources for cooperative MIMO sidelink communications between the relay UE and the destination UE. The groupcast communication manager 1130 may be configured as or otherwise support a means for monitoring the first set of resources for the source UE communication.

Figure 12:
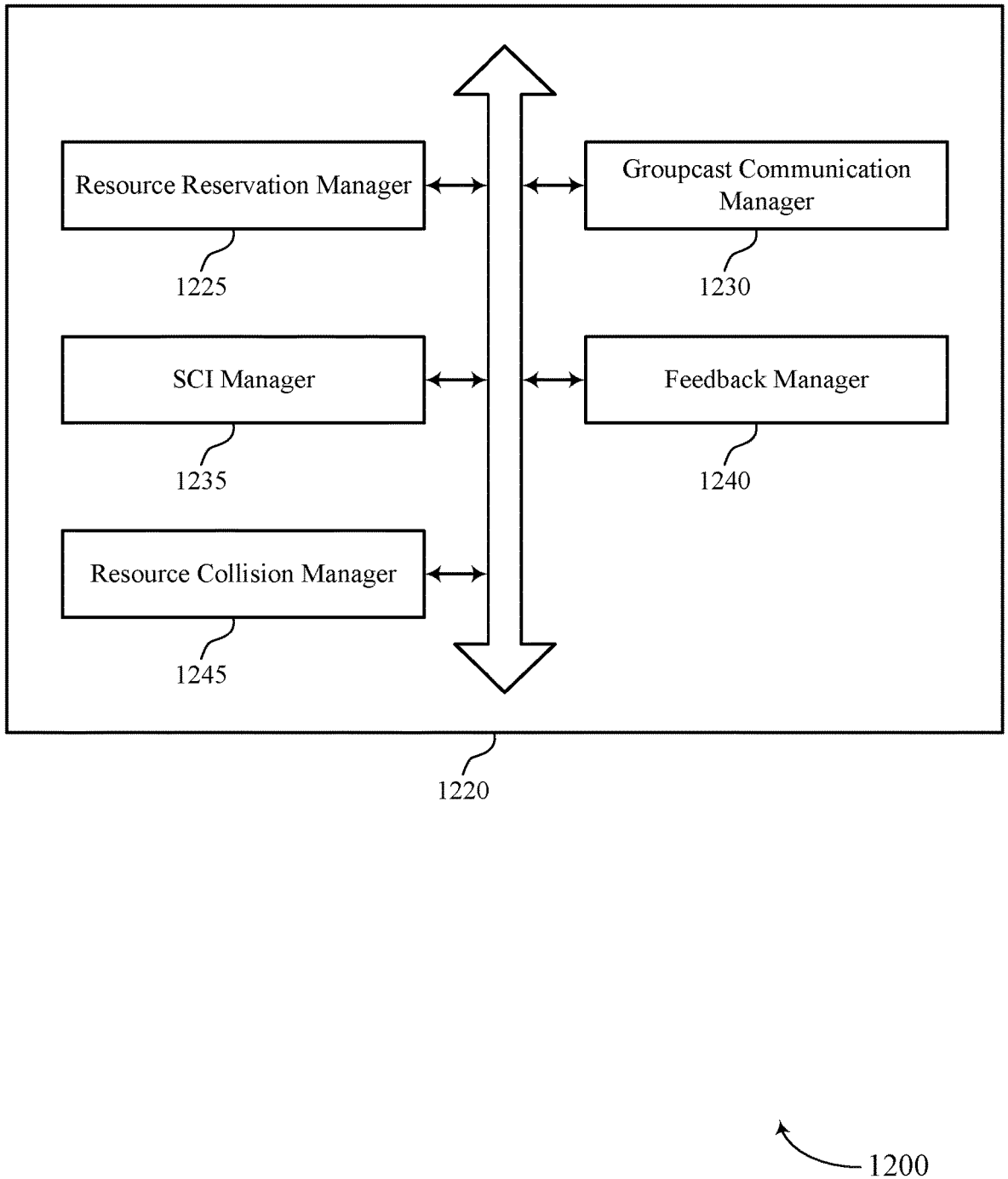
FIG. 12 shows a block diagram of a communications manager that supports resource selection and reservation for cooperative relay in sidelink networks in accordance with aspects of the present disclosure.

FIG. 12 shows a block diagram 1200 of a communications manager 1220 that supports resource selection and reservation for cooperative relay in sidelink networks in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of resource selection and reservation for cooperative relay in sidelink networks as described herein. For example, the communications manager 1220 may include a resource reservation manager 1225, a groupcast communication manager 1230, an SCI manager 1235, a feedback manager 1240, a resource collision manager 1245, or any combination thereof. Each of these components may communicate, directly or indirectly, with one another (e.g., via one or more buses).

The communications manager 1220 may support wireless communication at a source UE in accordance with examples as disclosed herein. The resource reservation manager 1225 may be configured as or otherwise support a means for transmitting, to a set of relay UEs, a resource reservation message that indicates a first set of resources for a source UE communication from the source UE to the set of relay UEs, and a second set of resources for one or more relay transmissions of the source UE communication from the set of relay UEs to a destination UE, where the first set of resources are groupcast sidelink resources for a groupcast sidelink communication from the source UE to the set of relay UEs, and the second set of resources are cooperative MIMO resources for cooperative MIMO sidelink communications from the set of relay UEs to the destination UE. The groupcast communication manager 1230 may be configured as or otherwise support a means for transmitting the source UE communication to the set of relay UEs in the groupcast sidelink communication using the first set of resources.

In some examples, to support transmitting the resource reservation message, the SCI manager 1235 may be configured as or otherwise support a means for transmitting sidelink control information (SCI) in a sidelink control channel to each UE of the set of relay UEs, where the SCI indicates the first set of resources and the second set of resources.

In some examples, to support transmitting the resource reservation message, the resource reservation manager 1225 may be configured as or otherwise support a means for transmitting a first indication of the first set of resources in a sidelink groupcast scheduling message to each UE of the set of relay UEs. In some examples, to support transmitting the resource reservation message, the resource reservation manager 1225 may be configured as or otherwise support a means for transmitting a second indication of the second set of resources in a medium access control (MAC) control element (CE) in a sidelink shared channel of the groupcast sidelink communication using the first set of resources.

In some examples, the feedback manager 1240 may be configured as or otherwise support a means for receiving a feedback indication from one or more relay UEs of the set of relay UEs that indicates the source UE transmission is unsuccessfully received at the set of relay UEs. In some examples, the feedback manager 1240 may be configured as or otherwise support a means for retransmitting the source UE communication to the set of relay UEs using the second set of resources. In some examples, the cooperative MIMO sidelink communications from the set of relay UEs to the destination UE are for asynchronized MIMO communications, and where the retransmitting uses a first available resource of the second set of resources.

In some examples, the resource reservation manager 1225 may be configured as or otherwise support a means for determining a third set of resources for the one or more relay transmissions of the source UE communication from the set of relay UEs to the destination UE. In some examples, the resource reservation manager 1225 may be configured as or otherwise support a means for transmitting an indication of the third set of resources to the set of relay UEs. In some examples, the second set of resources are for synchronized MIMO communications between the set of relay UEs and the destination UE, and where the destination UE provides an indication of a fourth set of resources for retransmissions of the synchronized MIMO communications based on unsuccessful receipt of the one or more relay transmissions. In some examples, the second set of resources are for asynchronized MIMO communications between the set of relay UEs and the destination UE, and where each relay UE of the set of relay UEs determines an associated retransmission resource based on an unsuccessful receipt of the one or more relay transmissions.

In some examples, the first set of resources includes multiple periodic resource reservations for a first predetermined number of instances of the source UE communication, and the second set of resources includes multiple periodic resource reservations for a second predetermined number of instances of the cooperative MIMO sidelink communications from the set of relay UEs to the destination UE, and where each of the first set of resources and the second set of resources is associated with a source ID of the source UE.

In some examples, the feedback manager 1240 may be configured as or otherwise support a means for receiving, at the source UE from one or more relay UEs of the set of relay UEs, a block feedback indication of successful or unsuccessful receipt of the source UE communication at the associated relay UE. In some examples, the feedback manager 1240 may be configured as or otherwise support a means for determining a new first set of resources and new second set of resources when the block feedback indication indicates unsuccessful receipt of the source UE communication. In some examples, the destination UE reserves a set of periodic MIMO retransmission resources based on an unsuccessful decoding of the cooperative MIMO sidelink communications in the second set of resources.

In some examples, the resource collision manager 1245 may be configured as or otherwise support a means for determining that a different source UE has indicated overlapping resources with one or more of the first set of resources or the second set of resources. In some examples, the resource collision manager 1245 may be configured as or otherwise support a means for transmitting or preempting the source UE communication based on a priority associated with the source UE communication and a relayed communication of the different source UE.

In some examples, when part of a relay UE of the set of relay UEs, the resource collision manager 1245 may determine which of multiple the source UE communications of different source UEs are to be transmitted to the destination UE when the second set of resources overlaps with relay resources reserved by the different source UEs, and where the determination is based on a priority of the associated communication, a timing of the associated communication, or any combinations thereof.

Additionally or alternatively, the communications manager 1220 may support wireless communication at a relay UE in accordance with examples as disclosed herein. In some examples, the resource reservation manager 1225 may be configured as or otherwise support a means for receiving, from a source UE, a resource reservation message that indicates a first set of resources for a source UE communication from the source UE, and a second set of resources for one or more relay transmissions of the source UE communication to a destination UE, where the first set of resources are groupcast sidelink resources for a groupcast sidelink communication from the source UE to the relay UE, and the second set of resources are cooperative MIMO resources for cooperative MIMO sidelink communications between the relay UE and the destination UE. In some examples, the groupcast communication manager 1230 may be configured as or otherwise support a means for monitoring the first set of resources for the source UE communication.

In some examples, to support receiving the resource reservation message, the SCI manager 1235 may be configured as or otherwise support a means for receiving sidelink control information (SCI) in a sidelink control channel from the source UE, where the SCI indicates the first set of resources and the second set of resources. In some examples, to support receiving the resource reservation message, the resource reservation manager 1225 may be configured as or otherwise support a means for receiving a first indication of the first set of resources in a sidelink groupcast scheduling message from the source UE, and receiving a second indication of the second set of resources in a medium access control (MAC) control element (CE) in a sidelink shared channel of the groupcast sidelink communication using the first set of resources.

In some examples, the feedback manager 1240 may be configured as or otherwise support a means for transmitting a feedback indication to the source UE that indicates the source UE transmission is unsuccessfully received at the relay UE. In some examples, the feedback manager 1240 may be configured as or otherwise support a means for monitoring for a retransmission of the source UE communication using the second set of resources.

In some examples, the resource reservation manager 1225 may be configured as or otherwise support a means for receiving, from the source UE, a third set of resources for the one or more relay transmissions of the source UE communication to the destination UE. In some examples, the destination UE provides an indication of a fourth set of resources for retransmissions of synchronized MIMO communications based on unsuccessful receipt of one or more relay transmissions from the relay UE. In some examples, where the relay UE determines the fourth set of resources for retransmissions of asynchronized MIMO communications based on unsuccessful receipt of the one or more relay transmissions at the destination UE.

In some examples, the first set of resources includes multiple periodic resource reservations for a first predetermined number of instances of the source UE communication, and the second set of resources includes multiple periodic resource reservations for a second predetermined number of instances of the cooperative MIMO sidelink communications from the relay UE to the destination UE, and where each of the first set of resources and the second set of resources is associated with a source ID of the source UE. In some examples, the destination UE reserves a set of periodic MIMO retransmission resources based on an unsuccessful decoding of the cooperative MIMO sidelink communications in the second set of resources.

In some examples, the resource collision manager 1245 may be configured as or otherwise support a means for determining that a different source UE has indicated overlapping resources with one or more of the first set of resources or the second set of resources. In some examples, the resource collision manager 1245 may be configured as or otherwise support a means for selecting which source UE to monitor based on a priority associated with the source UE communication and a relayed communication of the different source UE.

In some examples, the resource collision manager 1245 may be configured as or otherwise support a means for determining that the second set of resources overlaps with a third set of resources reserved by a different source UE for one or more different relay transmissions of the different source UE. In some examples, the resource collision manager 1245 may be configured as or otherwise support a means for selecting which relay transmission to transmit to the destination UE based on a priority of the associated communication, a timing of the associated communication, or any combinations thereof.

Figure 13:
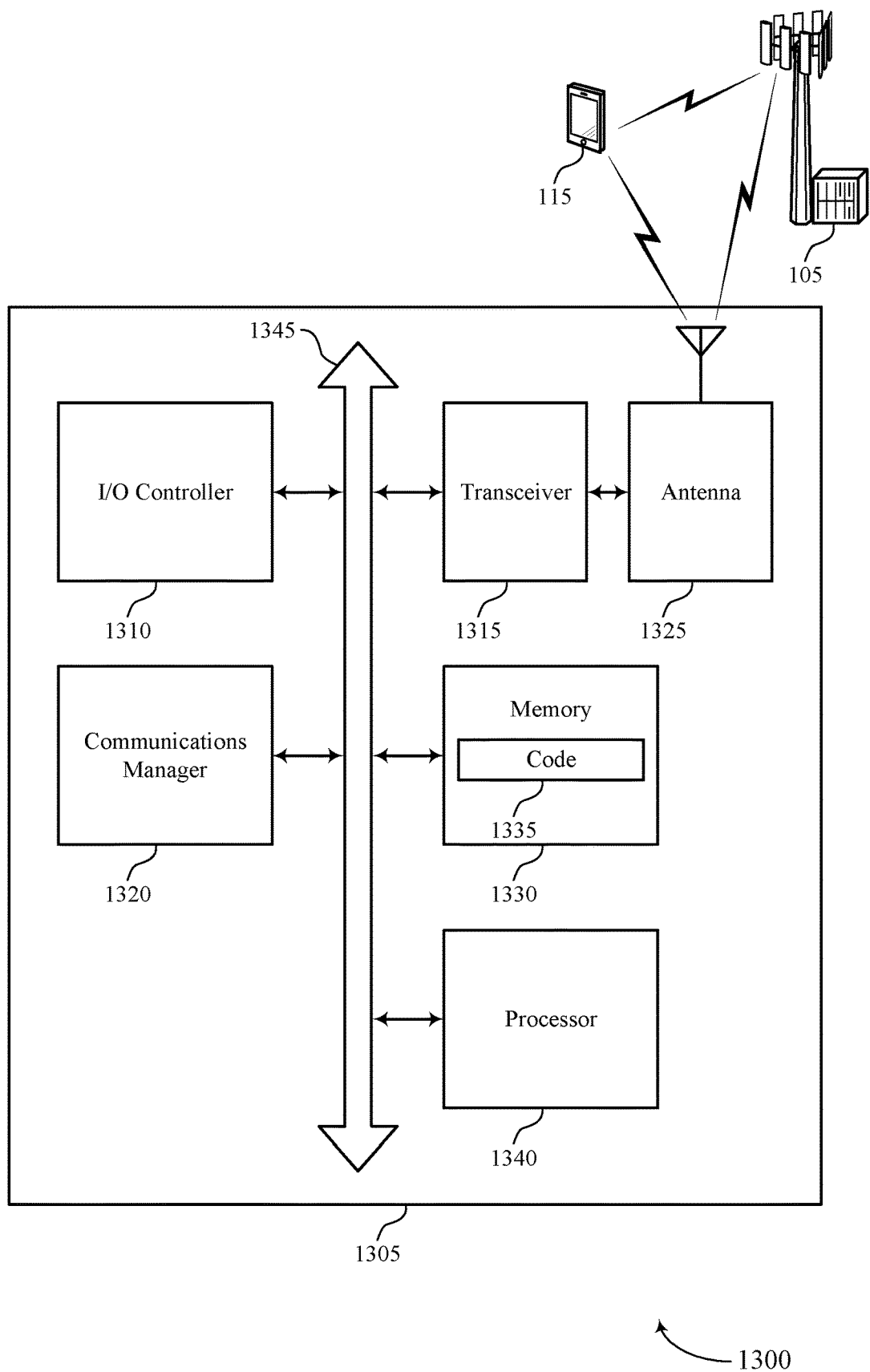
FIG. 13 shows a diagram of a system including a device that supports resource selection and reservation for cooperative relay in sidelink networks in accordance with aspects of the present disclosure.

FIG. 13 shows a diagram of a system 1300 including a device 1305 that supports resource selection and reservation for cooperative relay in sidelink networks in accordance with aspects of the present disclosure. The device 1305 may be an example of or include the components of a device 1005, a device 1105, or a UE 115 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include random access memory (RAM) and read-only memory (ROM). The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a basic I/O system (BIOS) which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting resource selection and reservation for cooperative relay in sidelink networks). For example, the device 1305 or a component of the device 1305 may include a processor 1340 and memory 1330 coupled to the processor 1340, the processor 1340 and memory 1330 configured to perform various functions described herein.

The communications manager 1320 may support wireless communication at a source UE in accordance with examples as disclosed herein. For example, the communications manager 1320 may be configured as or otherwise support a means for transmitting, to a set of relay UEs, a resource reservation message that indicates a first set of resources for a source UE communication from the source UE to the set of relay UEs, and a second set of resources for one or more relay transmissions of the source UE communication from the set of relay UEs to a destination UE, where the first set of resources are groupcast sidelink resources for a groupcast sidelink communication from the source UE to the set of relay UEs, and the second set of resources are cooperative MIMO resources for cooperative MIMO sidelink communications from the set of relay UEs to the destination UE. The communications manager 1320 may be configured as or otherwise support a means for transmitting the source UE communication to the set of relay UEs in the groupcast sidelink communication using the first set of resources.

Additionally or alternatively, the communications manager 1320 may support wireless communication at a relay UE in accordance with examples as disclosed herein. For example, the communications manager 1320 may be configured as or otherwise support a means for receiving, from a source UE, a resource reservation message that indicates a first set of resources for a source UE communication from the source UE, and a second set of resources for one or more relay transmissions of the source UE communication to a destination UE, where the first set of resources are groupcast sidelink resources for a groupcast sidelink communication from the source UE to the relay UE, and the second set of resources are cooperative MIMO resources for cooperative MIMO sidelink communications between the relay UE and the destination UE. The communications manager 1320 may be configured as or otherwise support a means for monitoring the first set of resources for the source UE communication.

By including or configuring the communications manager 1320 in accordance with examples as described herein, the device 1305 may support techniques for cooperative relay of communications between a source and a destination via multiple relays. Such techniques may enhance reliability of communications between the source and destination, which may provide diversity gain and power gain relative to a single relay UE, with increased reliability and coverage of the relay link. Further, such techniques may enhance efficiency by allowing a source UE to reserve resources for the relay UEs thus allowing the relay UEs to perform the relayed transmissions without coordination with other relay UEs and provide improved communication reliability, reduced latency, improved user experience, more efficient utilization of communication resources through reduced retransmissions, improved coordination between devices, or any combinations thereof.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of resource selection and reservation for cooperative relay in sidelink networks as described herein, or the processor 1340 and the memory 1330 may be otherwise configured to perform or support such operations.

Figure 14:
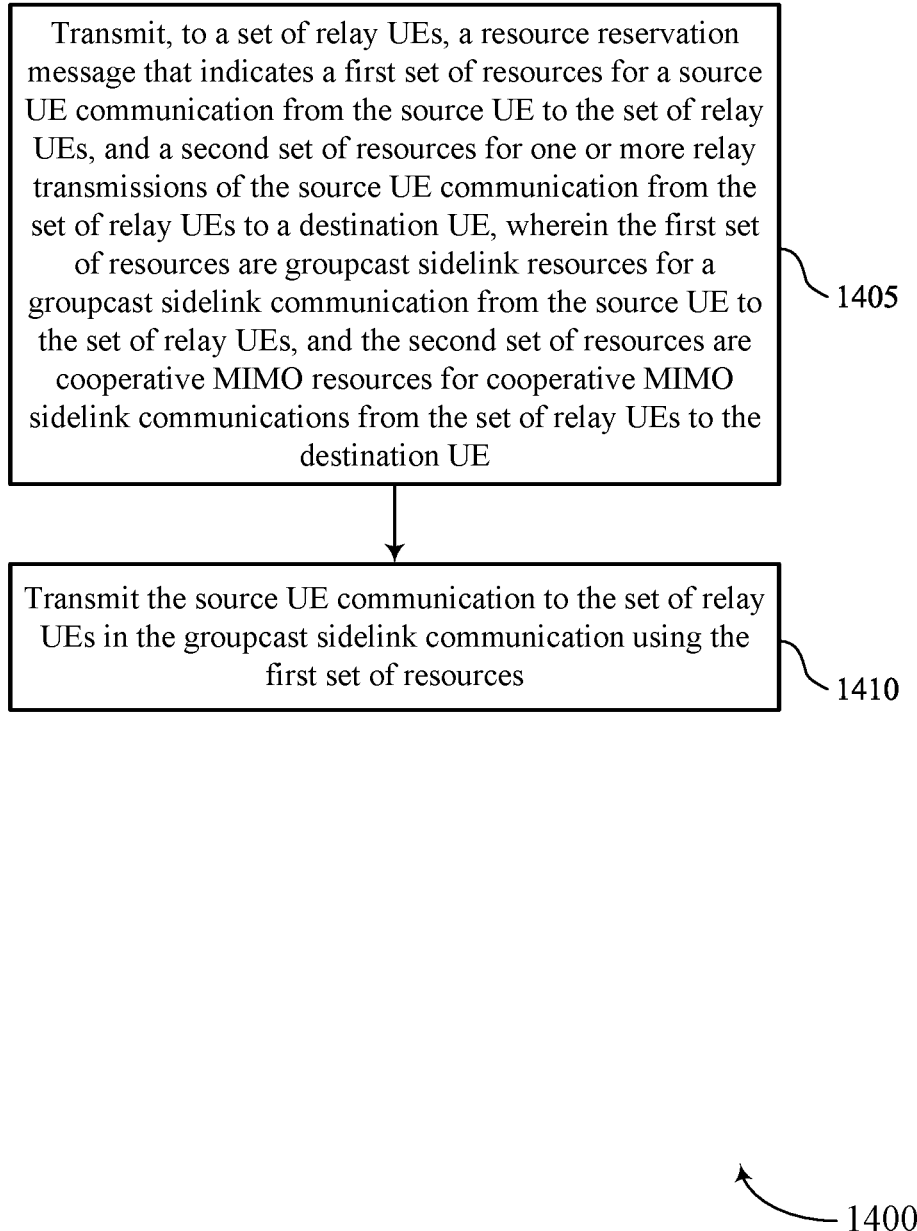
FIGS. 14 through 22 show flowcharts illustrating methods that support resource selection and reservation for cooperative relay in sidelink networks in accordance with aspects of the present disclosure.

FIG. 14 shows a flowchart illustrating a method 1400 that supports resource selection and reservation for cooperative relay in sidelink networks in accordance with aspects of the present disclosure. The operations of the method 1400 may be implemented by a UE or its components as described herein. For example, the operations of the method 1400 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1405, the method may include transmitting, to a set of relay UEs, a resource reservation message that indicates a first set of resources for a source UE communication from the source UE to the set of relay UEs, and a second set of resources for one or more relay transmissions of the source UE communication from the set of relay UEs to a destination UE, where the first set of resources are groupcast sidelink resources for a groupcast sidelink communication from the source UE to the set of relay UEs, and the second set of resources are cooperative MIMO resources for cooperative MIMO sidelink communications from the set of relay UEs to the destination UE. The operations of 1405 may be performed in accordance with examples as disclosed herein. In some examples, aspects of the operations of 1405 may be performed by a resource reservation manager 1225 as described with reference to FIG. 12.

At 1410, the method may include transmitting the source UE communication to the set of relay UEs in the groupcast sidelink communication using the first set of resources. The operations of 1410 may be performed in accordance with examples as disclosed herein. In some examples, aspects of the operations of 1410 may be performed by a groupcast communication manager 1230 as described with reference to FIG. 12.

Figure 15:
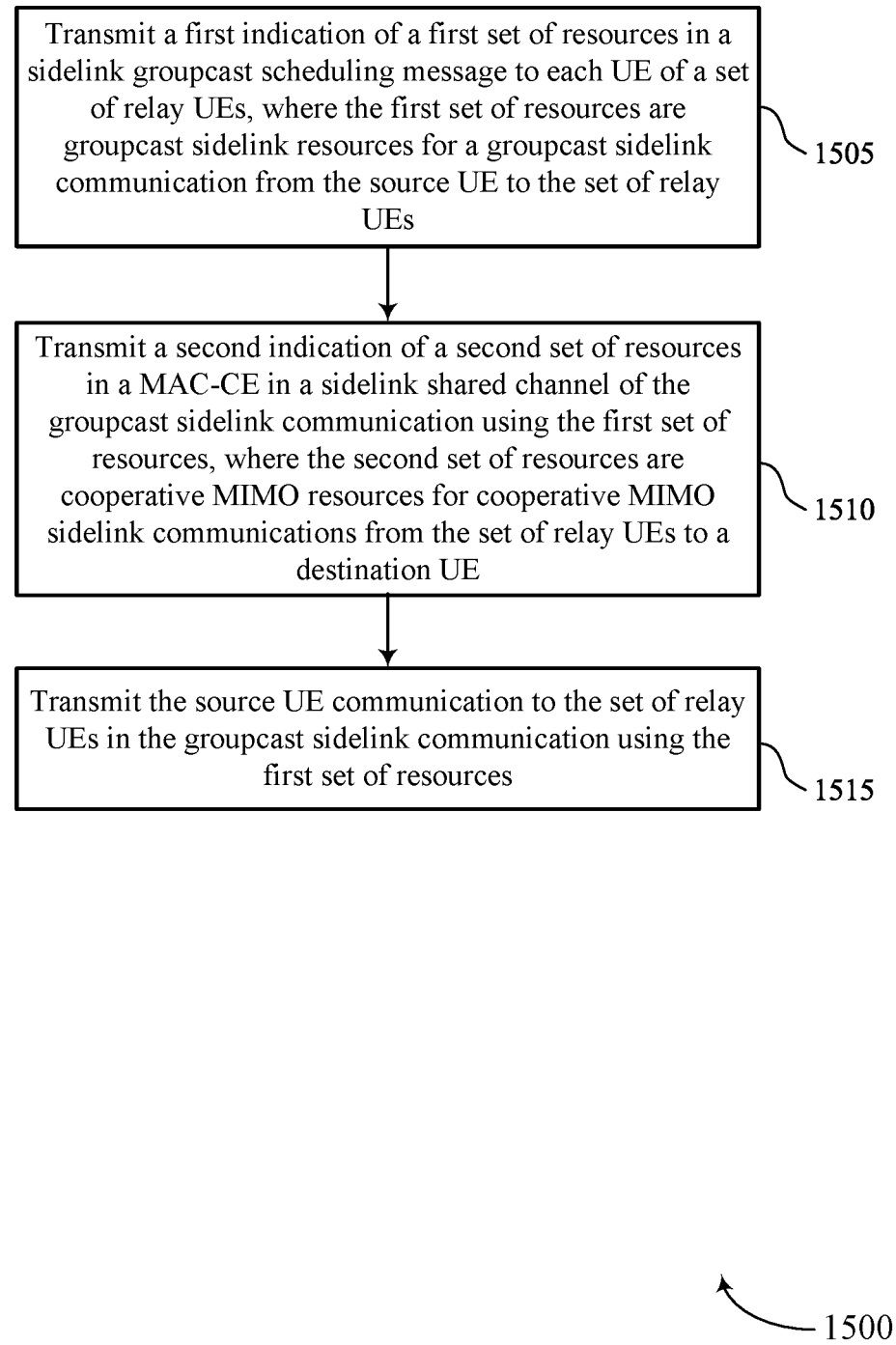

FIG. 15 shows a flowchart illustrating a method 1500 that supports resource selection and reservation for cooperative relay in sidelink networks in accordance with aspects of the present disclosure. The operations of the method 1500 may be implemented by a UE or its components as described herein. For example, the operations of the method 1500 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1505, the method may include transmitting a first indication of a first set of resources in a sidelink groupcast scheduling message to each UE of a set of relay UEs, where the first set of resources are groupcast sidelink resources for a groupcast sidelink communication from the source UE to the set of relay UEs. The operations of 1505 may be performed in accordance with examples as disclosed herein. In some examples, aspects of the operations of 1505 may be performed by a resource reservation manager 1225 as described with reference to FIG. 12.

At 1510, the method may include transmitting a second indication of a second set of resources in a MAC-CE in a sidelink shared channel of the groupcast sidelink communication using the first set of resources, where the second set of resources are cooperative MIMO resources for cooperative MIMO sidelink communications from the set of relay UEs to a destination UE. The operations of 1510 may be performed in accordance with examples as disclosed herein. In some examples, aspects of the operations of 1510 may be performed by a resource reservation manager 1225 as described with reference to FIG. 12.

At 1515, the method may include transmitting the source UE communication to the set of relay UEs in the groupcast sidelink communication using the first set of resources. The operations of 1515 may be performed in accordance with examples as disclosed herein. In some examples, aspects of the operations of 1515 may be performed by a groupcast communication manager 1230 as described with reference to FIG. 12.

Figure 16:
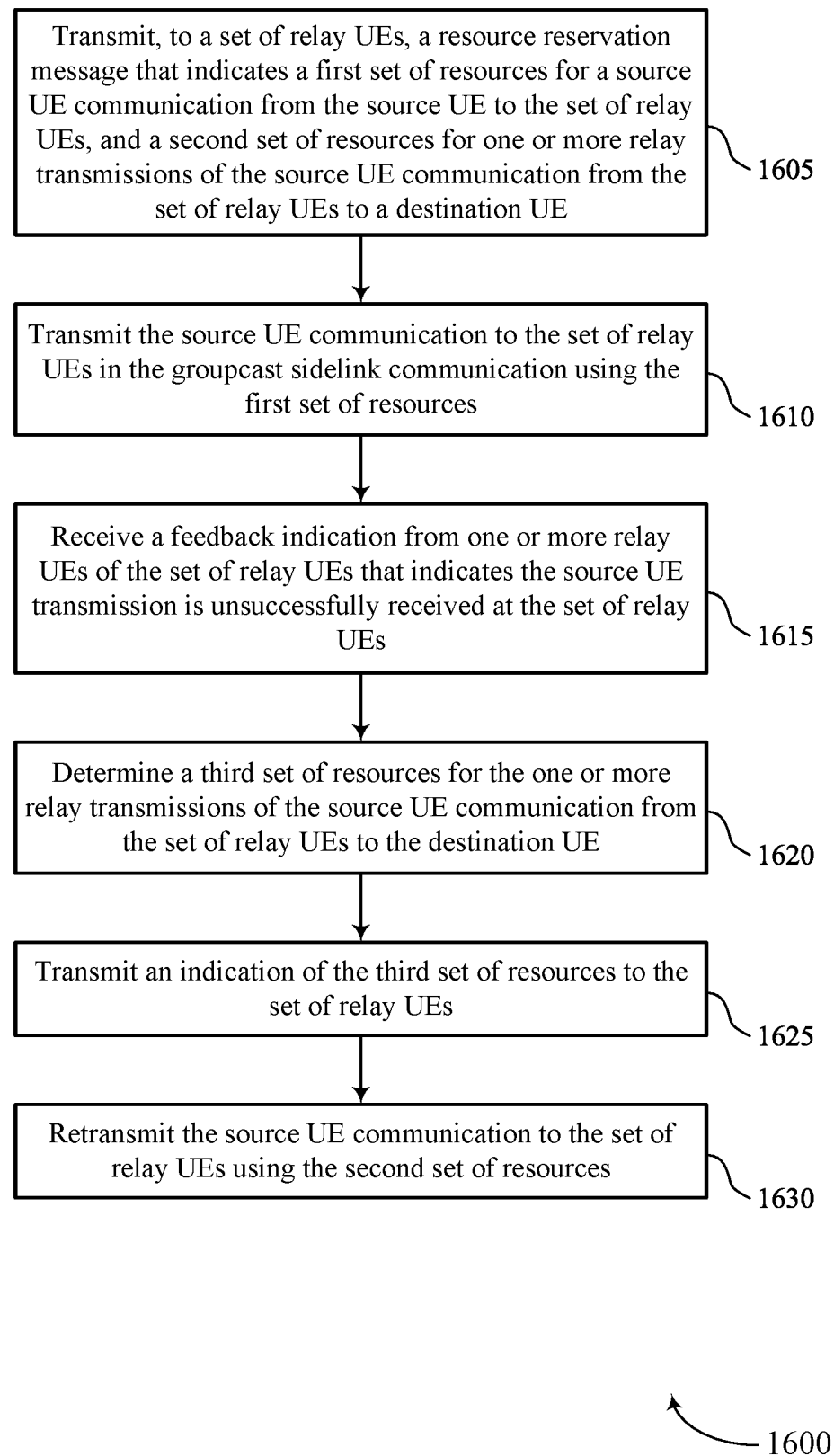

FIG. 16 shows a flowchart illustrating a method 1600 that supports resource selection and reservation for cooperative relay in sidelink networks in accordance with aspects of the present disclosure. The operations of the method 1600 may be implemented by a UE or its components as described herein. For example, the operations of the method 1600 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1605, the method may include transmitting, to a set of relay UEs, a resource reservation message that indicates a first set of resources for a source UE communication from the source UE to the set of relay UEs, and a second set of resources for one or more relay transmissions of the source UE communication from the set of relay UEs to a destination UE. The operations of 1605 may be performed in accordance with examples as disclosed herein. In some examples, aspects of the operations of 1605 may be performed by a resource reservation manager 1225 as described with reference to FIG. 12.

At 1610, the method may include transmitting the source UE communication to the set of relay UEs in the groupcast sidelink communication using the first set of resources. The operations of 1610 may be performed in accordance with examples as disclosed herein. In some examples, aspects of the operations of 1610 may be performed by a groupcast communication manager 1230 as described with reference to FIG. 12.

At 1615, the method may include receiving a feedback indication from one or more relay UEs of the set of relay UEs that indicates the source UE transmission is unsuccessfully received at the set of relay UEs. The operations of 1615 may be performed in accordance with examples as disclosed herein. In some examples, aspects of the operations of 1615 may be performed by a feedback manager 1240 as described with reference to FIG. 12.

At 1620, the method may include determining a third set of resources for the one or more relay transmissions of the source UE communication from the set of relay UEs to the destination UE. The operations of 1620 may be performed in accordance with examples as disclosed herein. In some examples, aspects of the operations of 1620 may be performed by a resource reservation manager 1225 as described with reference to FIG. 12.

At 1625, the method may include transmitting an indication of the third set of resources to the set of relay UEs. The operations of 1625 may be performed in accordance with examples as disclosed herein. In some examples, aspects of the operations of 1625 may be performed by a resource reservation manager 1225 as described with reference to FIG. 12.

At 1630, the method may include retransmitting the source UE communication to the set of relay UEs using the second set of resources. The operations of 1630 may be performed in accordance with examples as disclosed herein. In some examples, aspects of the operations of 1630 may be performed by a feedback manager 1240 as described with reference to FIG. 12. In some cases, the cooperative MIMO sidelink communications from the set of relay UEs to the destination UE are for asynchronized MIMO communications, and where the retransmitting uses a first available resource of the second set of resources.

Figure 17:
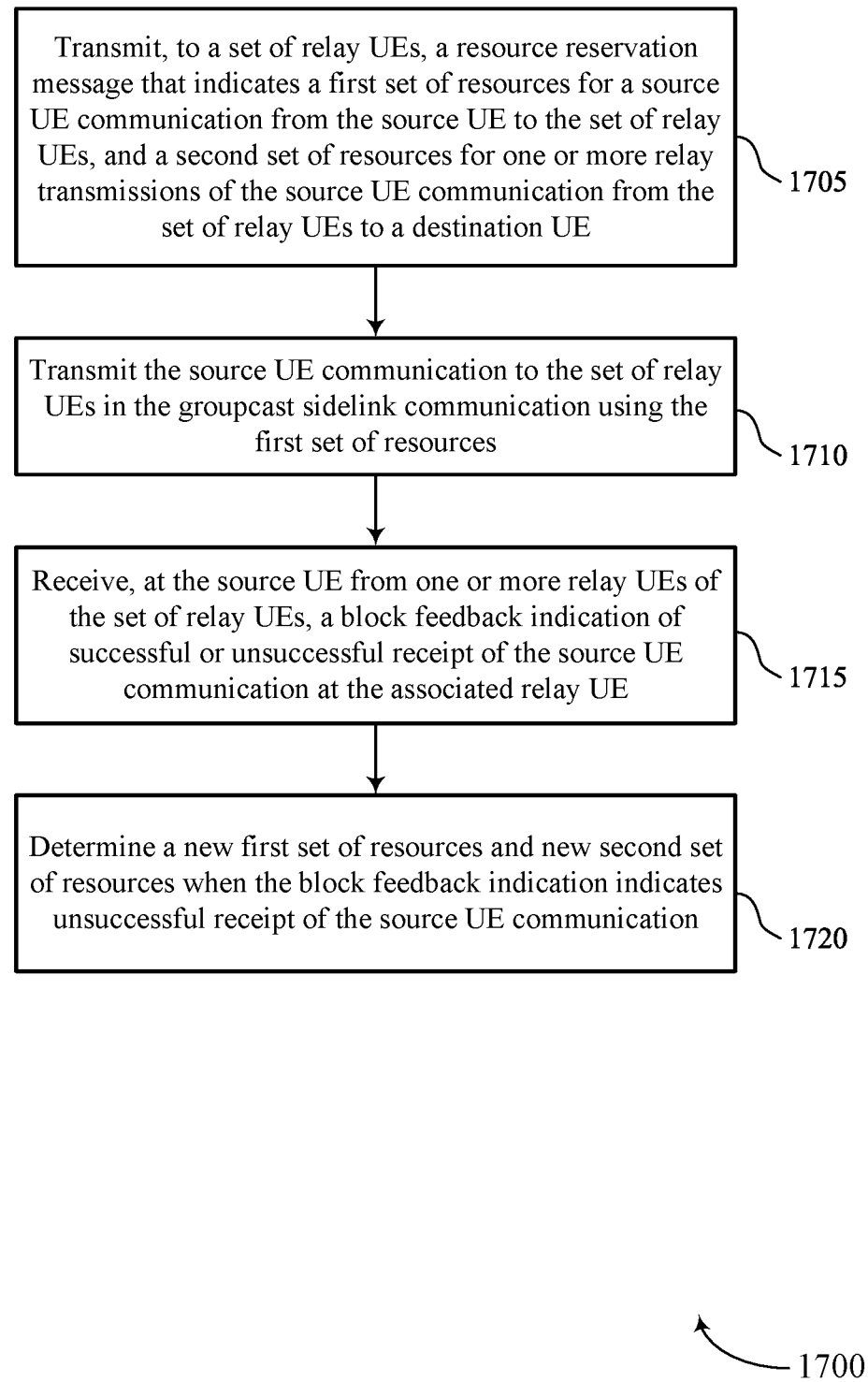

FIG. 17 shows a flowchart illustrating a method 1700 that supports resource selection and reservation for cooperative relay in sidelink networks in accordance with aspects of the present disclosure. The operations of the method 1700 may be implemented by a UE or its components as described herein. For example, the operations of the method 1700 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1705, the method may include transmitting, to a set of relay UEs, a resource reservation message that indicates a first set of resources for a source UE communication from the source UE to the set of relay UEs, and a second set of resources for one or more relay transmissions of the source UE communication from the set of relay UEs to a destination UE. The operations of 1705 may be performed in accordance with examples as disclosed herein. In some examples, aspects of the operations of 1705 may be performed by a resource reservation manager 1225 as described with reference to FIG. 12.

At 1710, the method may include transmitting the source UE communication to the set of relay UEs in the groupcast sidelink communication using the first set of resources. The operations of 1710 may be performed in accordance with examples as disclosed herein. In some examples, aspects of the operations of 1710 may be performed by a groupcast communication manager 1230 as described with reference to FIG. 12. In some cases, the first set of resources include multiple periodic resource reservations for a first predetermined number of instances of the source UE communication, and the second set of resources includes multiple periodic resource reservations for a second predetermined number of instances of the cooperative MIMO sidelink communications from the set of relay UEs to the destination UE, and where each of the first set of resources and the second set of resources is associated with a source ID of the source UE.

At 1715, the method may include receiving, at the source UE from one or more relay UEs of the set of relay UEs, a block feedback indication of successful or unsuccessful receipt of the source UE communication at the associated relay UE. The operations of 1715 may be performed in accordance with examples as disclosed herein. In some examples, aspects of the operations of 1715 may be performed by a feedback manager 1240 as described with reference to FIG. 12.

At 1720, the method may include determining a new first set of resources and new second set of resources when the block feedback indication indicates unsuccessful receipt of the source UE communication. The operations of 1720 may be performed in accordance with examples as disclosed herein. In some examples, aspects of the operations of 1720 may be performed by a feedback manager 1240 as described with reference to FIG. 12.

Figure 18:
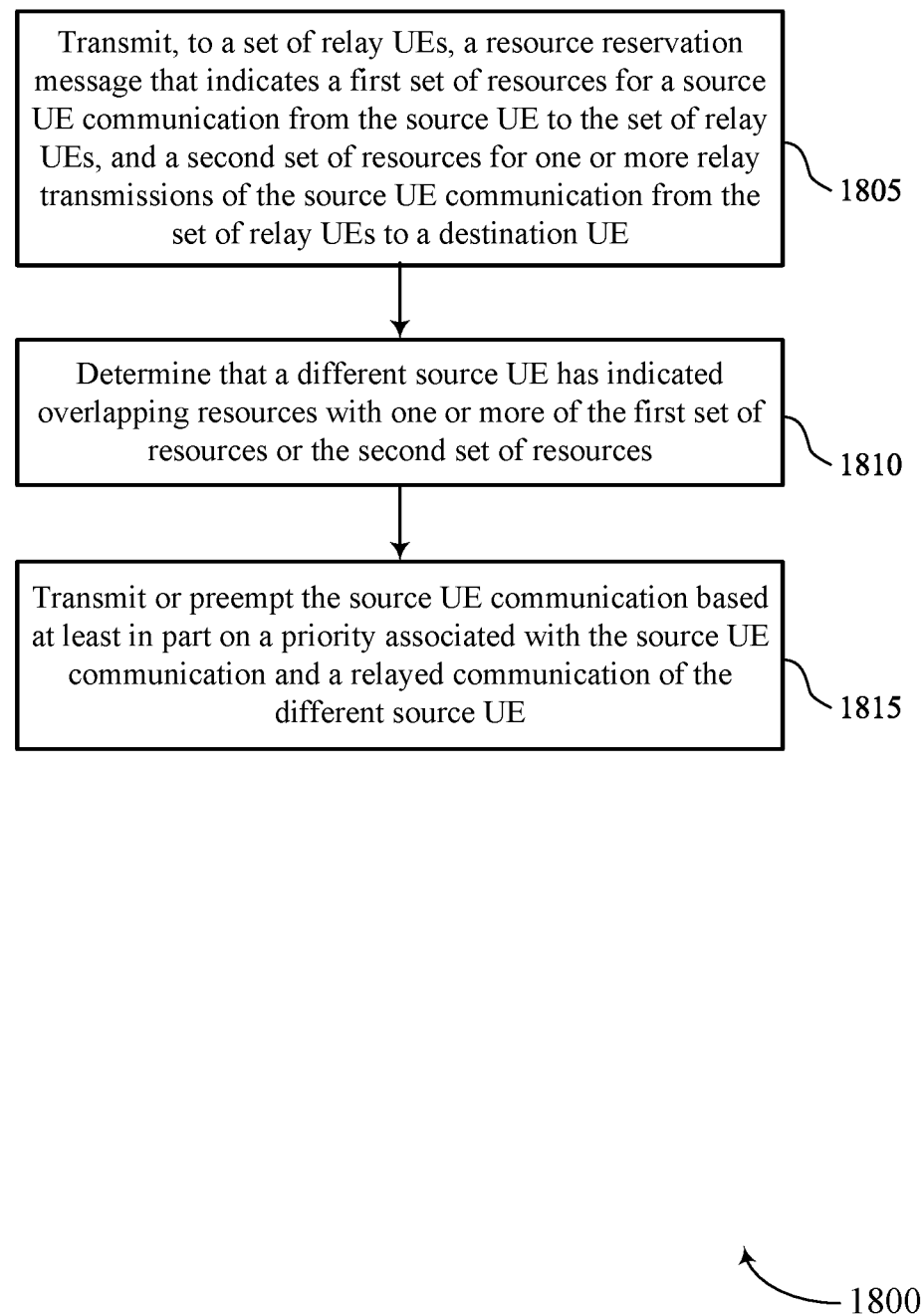

FIG. 18 shows a flowchart illustrating a method 1800 that supports resource selection and reservation for cooperative relay in sidelink networks in accordance with aspects of the present disclosure. The operations of the method 1800 may be implemented by a UE or its components as described herein. For example, the operations of the method 1800 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1805, the method may include transmitting, to a set of relay UEs, a resource reservation message that indicates a first set of resources for a source UE communication from the source UE to the set of relay UEs, and a second set of resources for one or more relay transmissions of the source UE communication from the set of relay UEs to a destination UE. The operations of 1805 may be performed in accordance with examples as disclosed herein. In some examples, aspects of the operations of 1805 may be performed by a resource reservation manager 1225 as described with reference to FIG. 12.

At 1810, the method may include determining that a different source UE has indicated overlapping resources with one or more of the first set of resources or the second set of resources. The operations of 1810 may be performed in accordance with examples as disclosed herein. In some examples, aspects of the operations of 1810 may be performed by a resource collision manager 1245 as described with reference to FIG. 12.

At 1815, the method may include transmitting or preempting the source UE communication based on a priority associated with the source UE communication and a relayed communication of the different source UE. The operations of 1815 may be performed in accordance with examples as disclosed herein. In some examples, aspects of the operations of 1815 may be performed by a resource collision manager 1245 as described with reference to FIG. 12.

Figure 19:
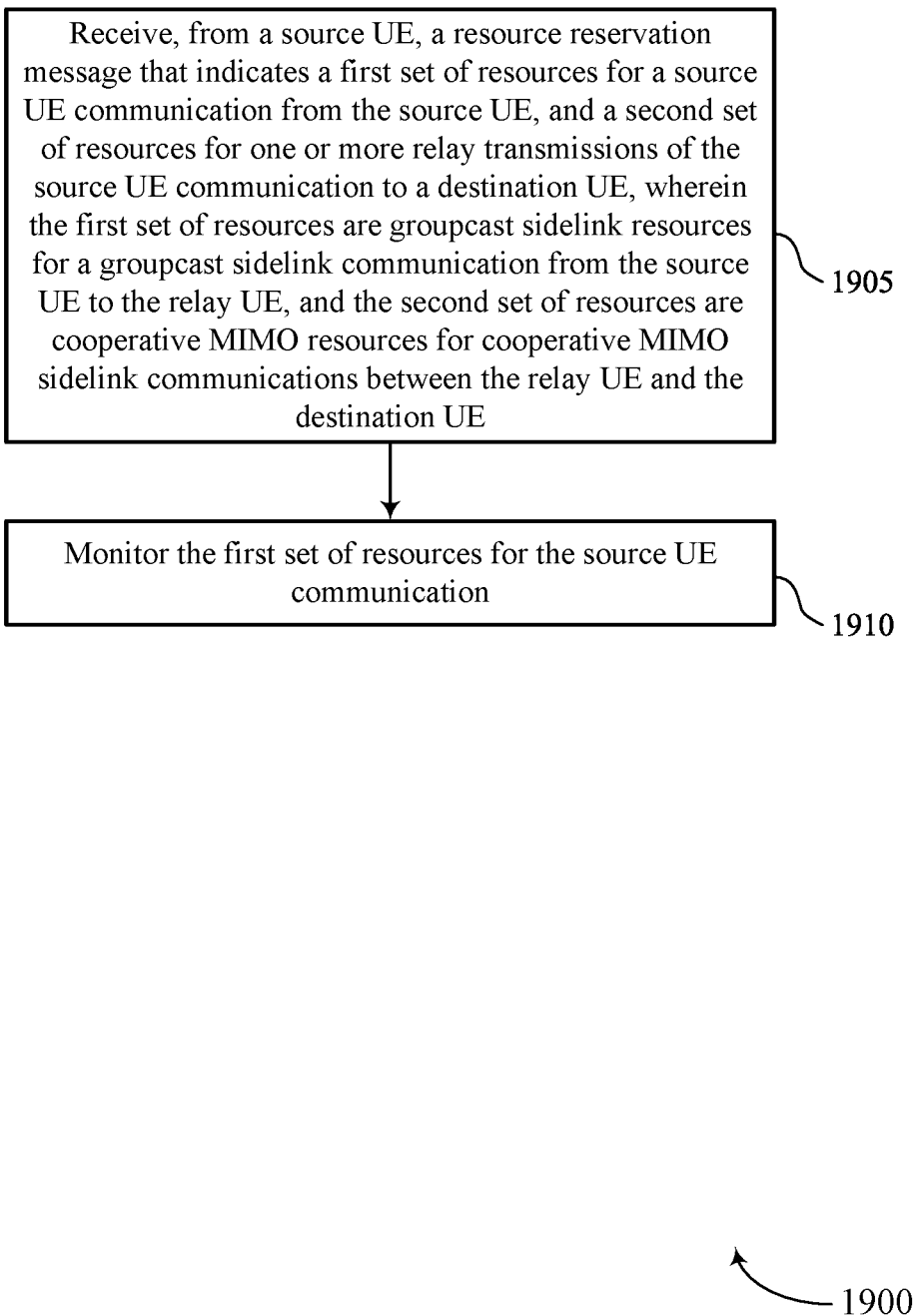

FIG. 19 shows a flowchart illustrating a method 1900 that supports resource selection and reservation for cooperative relay in sidelink networks in accordance with aspects of the present disclosure. The operations of the method 1900 may be implemented by a UE or its components as described herein. For example, the operations of the method 1900 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 1905, the method may include receiving, from a source UE, a resource reservation message that indicates a first set of resources for a source UE communication from the source UE, and a second set of resources for one or more relay transmissions of the source UE communication to a destination UE, where the first set of resources are groupcast sidelink resources for a groupcast sidelink communication from the source UE to the relay UE, and the second set of resources are cooperative MIMO resources for cooperative MIMO sidelink communications between the relay UE and the destination UE. The operations of 1905 may be performed in accordance with examples as disclosed herein. In some examples, aspects of the operations of 1905 may be performed by a resource reservation manager 1225 as described with reference to FIG. 12.

At 1910, the method may include monitoring the first set of resources for the source UE communication. The operations of 1910 may be performed in accordance with examples as disclosed herein. In some examples, aspects of the operations of 1910 may be performed by a groupcast communication manager 1230 as described with reference to FIG. 12.

Figure 20:
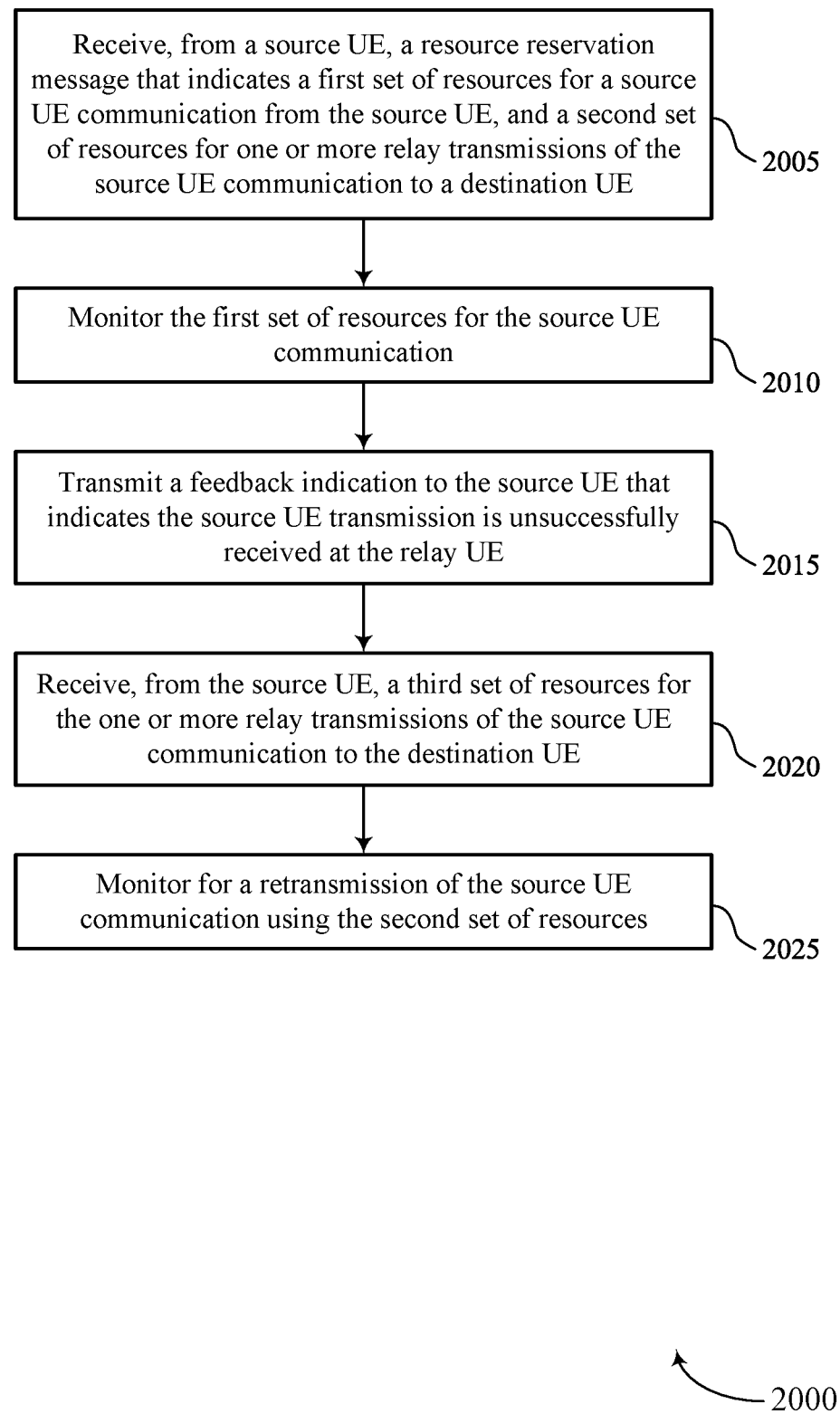

FIG. 20 shows a flowchart illustrating a method 2000 that supports resource selection and reservation for cooperative relay in sidelink networks in accordance with aspects of the present disclosure. The operations of the method 2000 may be implemented by a UE or its components as described herein. For example, the operations of the method 2000 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2005, the method may include receiving, from a source UE, a resource reservation message that indicates a first set of resources for a source UE communication from the source UE, and a second set of resources for one or more relay transmissions of the source UE communication to a destination UE. The operations of 2005 may be performed in accordance with examples as disclosed herein. In some examples, aspects of the operations of 2005 may be performed by a resource reservation manager 1225 as described with reference to FIG. 12.

At 2010, the method may include monitoring the first set of resources for the source UE communication. The operations of 2010 may be performed in accordance with examples as disclosed herein. In some examples, aspects of the operations of 2010 may be performed by a groupcast communication manager 1230 as described with reference to FIG. 12.

At 2015, the method may include transmitting a feedback indication to the source UE that indicates the source UE transmission is unsuccessfully received at the relay UE. The operations of 2015 may be performed in accordance with examples as disclosed herein. In some examples, aspects of the operations of 2015 may be performed by a feedback manager 1240 as described with reference to FIG. 12.

At 2020, the method may include receiving, from the source UE, a third set of resources for the one or more relay transmissions of the source UE communication to the destination UE. The operations of 2020 may be performed in accordance with examples as disclosed herein. In some examples, aspects of the operations of 2020 may be performed by a resource reservation manager 1225 as described with reference to FIG. 12.

At 2025, the method may include monitoring for a retransmission of the source UE communication using the second set of resources. The operations of 2025 may be performed in accordance with examples as disclosed herein. In some examples, aspects of the operations of 2025 may be performed by a feedback manager 1240 as described with reference to FIG. 12.

Figure 21:
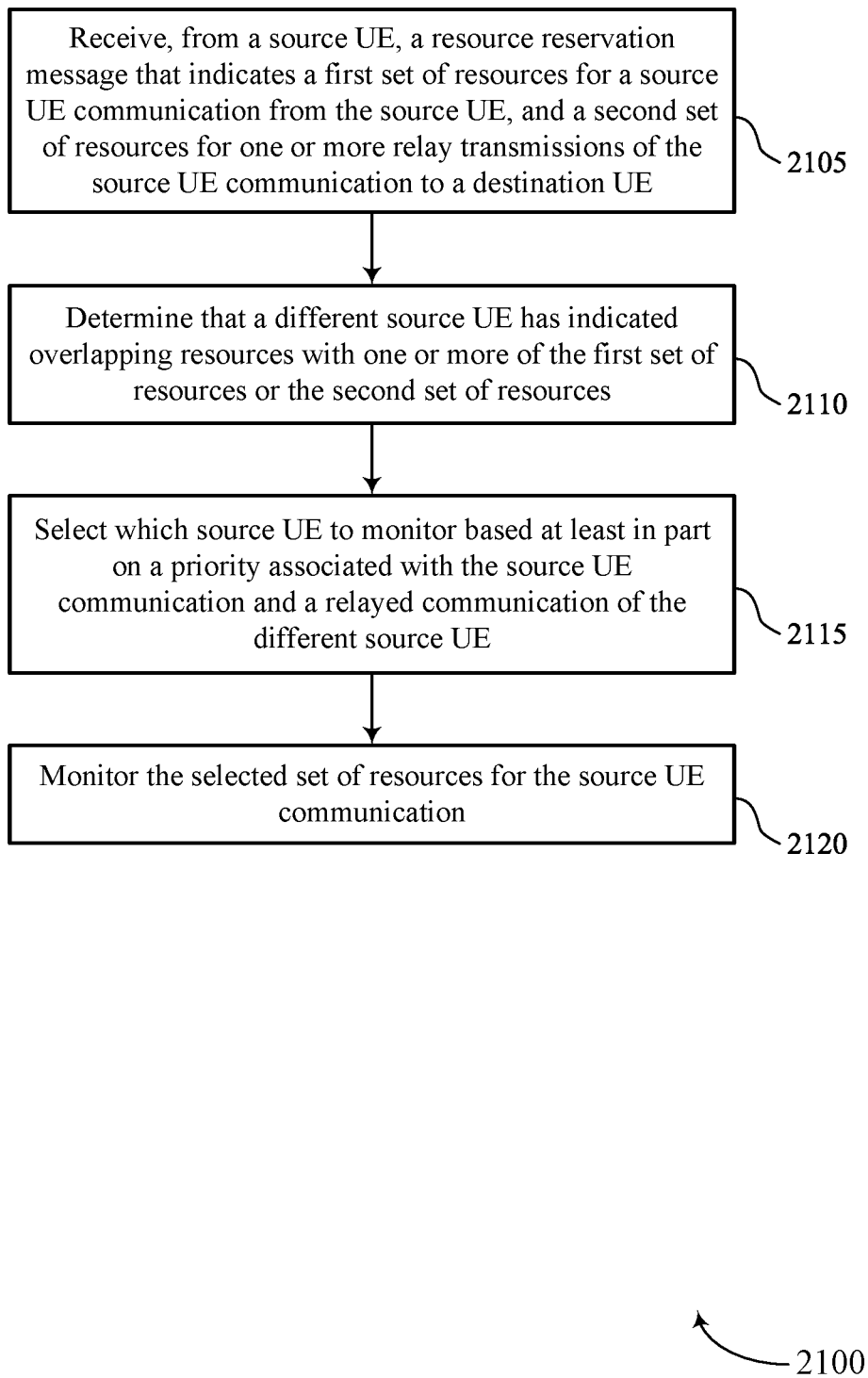

FIG. 21 shows a flowchart illustrating a method 2100 that supports resource selection and reservation for cooperative relay in sidelink networks in accordance with aspects of the present disclosure. The operations of the method 2100 may be implemented by a UE or its components as described herein. For example, the operations of the method 2100 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2105, the method may include receiving, from a source UE, a resource reservation message that indicates a first set of resources for a source UE communication from the source UE, and a second set of resources for one or more relay transmissions of the source UE communication to a destination UE. The operations of 2105 may be performed in accordance with examples as disclosed herein. In some examples, aspects of the operations of 2105 may be performed by a resource reservation manager 1225 as described with reference to FIG. 12.

At 2110, the method may include determining that a different source UE has indicated overlapping resources with one or more of the first set of resources or the second set of resources. The operations of 2110 may be performed in accordance with examples as disclosed herein. In some examples, aspects of the operations of 2110 may be performed by a resource collision manager 1245 as described with reference to FIG. 12.

At 2115, the method may include selecting which source UE to monitor based on a priority associated with the source UE communication and a relayed communication of the different source UE. The operations of 2115 may be performed in accordance with examples as disclosed herein. In some examples, aspects of the operations of 2115 may be performed by a resource collision manager 1245 as described with reference to FIG. 12.

At 2120, the method may include monitoring the selected set of resources for the source UE communication. The operations of 2120 may be performed in accordance with examples as disclosed herein. In some examples, aspects of the operations of 2120 may be performed by a groupcast communication manager 1230 as described with reference to FIG. 12.

Figure 22:
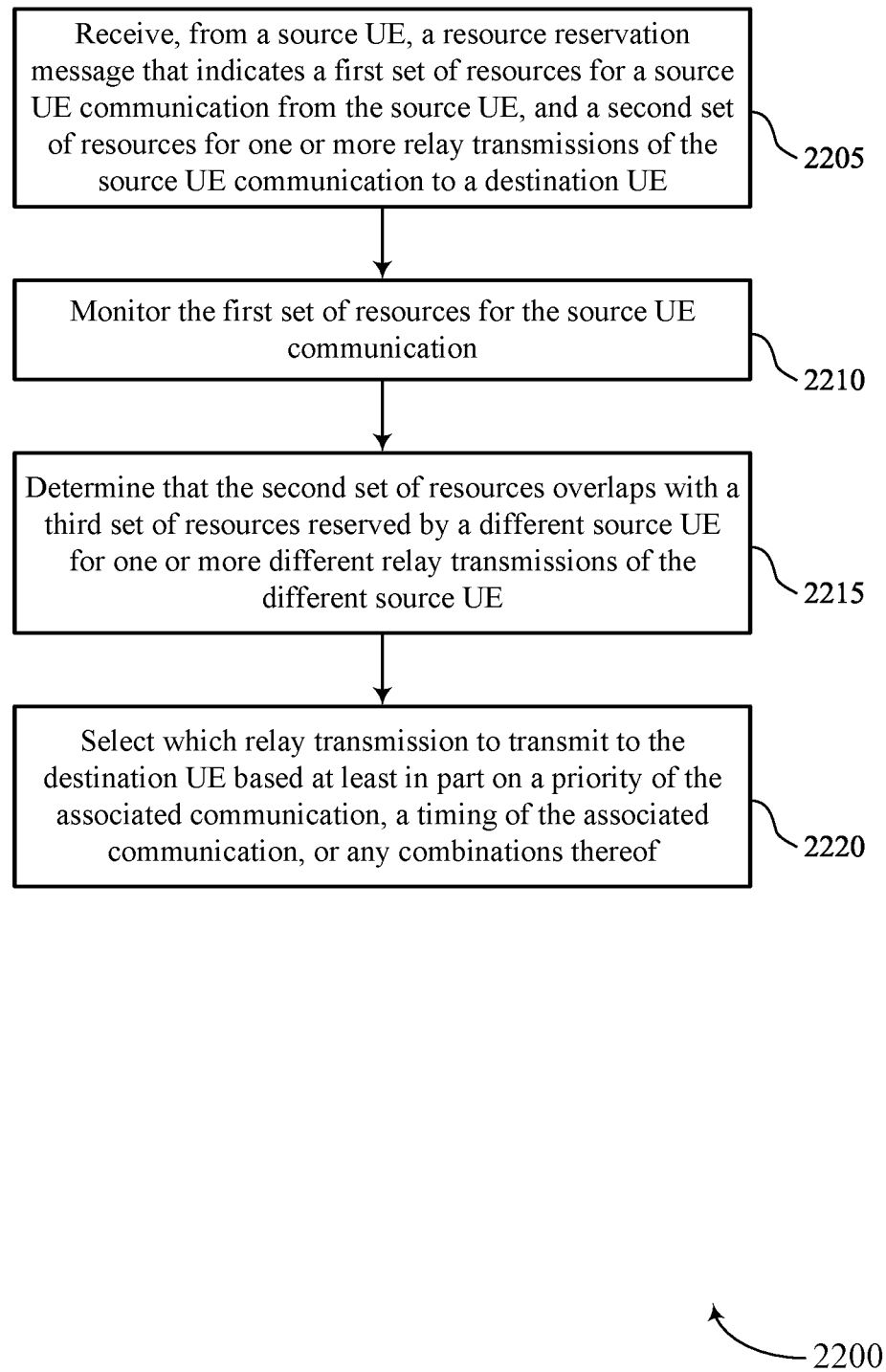

FIG. 22 shows a flowchart illustrating a method 2200 that supports resource selection and reservation for cooperative relay in sidelink networks in accordance with aspects of the present disclosure. The operations of the method 2200 may be implemented by a UE or its components as described herein. For example, the operations of the method 2200 may be performed by a UE 115 as described with reference to FIGS. 1 through 13. In some examples, a UE may execute a set of instructions to control the functional elements of the UE to perform the described functions. Additionally or alternatively, the UE may perform aspects of the described functions using special-purpose hardware.

At 2205, the method may include receiving, from a source UE, a resource reservation message that indicates a first set of resources for a source UE communication from the source UE, and a second set of resources for one or more relay transmissions of the source UE communication to a destination UE. The operations of 2205 may be performed in accordance with examples as disclosed herein. In some examples, aspects of the operations of 2205 may be performed by a resource reservation manager 1225 as described with reference to FIG. 12.

At 2210, the method may include monitoring the first set of resources for the source UE communication. The operations of 2210 may be performed in accordance with examples as disclosed herein. In some examples, aspects of the operations of 2210 may be performed by a groupcast communication manager 1230 as described with reference to FIG. 12.

At 2215, the method may include determining that the second set of resources overlaps with a third set of resources reserved by a different source UE for one or more different relay transmissions of the different source UE. The operations of 2215 may be performed in accordance with examples as disclosed herein. In some examples, aspects of the operations of 2215 may be performed by a resource collision manager 1245 as described with reference to FIG. 12.

At 2220, the method may include selecting which relay transmission to transmit to the destination UE based on a priority of the associated communication, a timing of the associated communication, or any combinations thereof. The operations of 2220 may be performed in accordance with examples as disclosed herein. In some examples, aspects of the operations of 2220 may be performed by a resource collision manager 1245 as described with reference to FIG. 12.

The following provides an overview of aspects of the present disclosure:

Aspect 1: A method for wireless communication at a source UE, comprising: transmitting, to a set of relay UEs, a resource reservation message that indicates a first set of resources for a source UE communication from the source UE to the set of relay UEs, and a second set of resources for one or more relay transmissions of the source UE communication from the set of relay UEs to a destination UE, wherein the first set of resources are groupcast sidelink resources for a groupcast sidelink communication from the source UE to the set of relay UEs, and the second set of resources are cooperative MIMO resources for cooperative MIMO sidelink communications from the set of relay UEs to the destination UE; and transmitting the source UE communication to the set of relay UEs in the groupcast sidelink communication using the first set of resources.

Aspect 2: The method of aspect 1, wherein the transmitting the resource reservation message comprises: transmitting SCI in a sidelink control channel to each UE of the set of relay UEs, wherein the SCI indicates the first set of resources and the second set of resources.

Aspect 3: The method of aspect 1, wherein the transmitting the resource reservation message comprises: transmitting a first indication of the first set of resources in a sidelink groupcast scheduling message to each UE of the set of relay UEs; and transmitting a second indication of the second set of resources in a MAC-CE in a sidelink shared channel of the groupcast sidelink communication using the first set of resources.

Aspect 4: The method of any of aspects 1 through 3, further comprising: receiving a feedback indication from one or more relay UEs of the set of relay UEs that indicates the source UE transmission is unsuccessfully received at the set of relay UEs; and retransmitting the source UE communication to the set of relay UEs using the second set of resources.

Aspect 5: The method of aspect 4, wherein the cooperative MIMO sidelink communications from the set of relay UEs to the destination UE are for asynchronized MIMO communications, and wherein the retransmitting uses a first available resource of the second set of resources.

Aspect 6: The method of any of aspects 4 through 5, further comprising: determining a third set of resources for the one or more relay transmissions of the source UE communication from the set of relay UEs to the destination UE; and transmitting an indication of the third set of resources to the set of relay UEs.

Aspect 7: The method of any of aspects 1 through 3, wherein the second set of resources are for synchronized MIMO communications between the set of relay UEs and the destination UE, and wherein the destination UE provides an indication of a fourth set of resources for retransmissions of the synchronized MIMO communications based on unsuccessful receipt of the one or more relay transmissions.

Aspect 8: The method of any of aspects 1 through 3, wherein the second set of resources are for asynchronized MIMO communications between the set of relay UEs and the destination UE, and wherein each relay UE of the set of relay UEs determines an associated retransmission resource based at least in part on an unsuccessful receipt of the one or more relay transmissions.

Aspect 9: The method of any of aspects 1 through 3, wherein the first set of resources includes multiple periodic resource reservations for a first predetermined number of instances of the source UE communication, and the second set of resources includes multiple periodic resource reservations for a second predetermined number of instances of the cooperative MIMO sidelink communications from the set of relay UEs to the destination UE, and wherein each of the first set of resources and the second set of resources is associated with a source ID of the source UE.

Aspect 10: The method of aspect 9, further comprising: receiving, at the source UE from one or more relay UEs of the set of relay UEs, a block feedback indication of successful or unsuccessful receipt of the source UE communication at the associated relay UE; and determining a new first set of resources and new second set of resources when the block feedback indication indicates unsuccessful receipt of the source UE communication.

Aspect 11: The method of any of aspects 9 through 10, wherein the destination UE reserves a set of periodic MIMO retransmission resources based at least in part on an unsuccessful decoding of the cooperative MIMO sidelink communications in the second set of resources.

Aspect 12: The method of any of aspects 1 through 11, further comprising: determining that a different source UE has indicated overlapping resources with one or more of the first set of resources or the second set of resources; and transmitting or preempting the source UE communication based at least in part on a priority associated with the source UE communication and a relayed communication of the different source UE.

Aspect 13: The method of any of aspects 1 through 12, wherein each relay UE of the set of relay UEs determines which of the source UE communication or a different communication of a different source UE are to be transmitted to the destination UE when the second set of resources overlaps with relay resources reserved by the different source UE, and wherein the determination is based at least in part on a priority of the associated communication, a timing of the associated communication, or any combinations thereof.

Aspect 14: A method for wireless communication at a relay UE, comprising: receiving, from a source UE, a resource reservation message that indicates a first set of resources for a source UE communication from the source UE, and a second set of resources for one or more relay transmissions of the source UE communication to a destination UE, wherein the first set of resources are groupcast sidelink resources for a groupcast sidelink communication from the source UE to the relay UE, and the second set of resources are cooperative MIMO resources for cooperative MIMO sidelink communications between the relay UE and the destination UE; and monitoring the first set of resources for the source UE communication.

Aspect 15: The method of aspect 14, wherein the receiving the resource reservation message comprises: receiving SCI in a sidelink control channel from the source UE, wherein the SCI indicates the first set of resources and the second set of resources; or receiving a first indication of the first set of resources in a sidelink groupcast scheduling message from the source UE, and receiving a second indication of the second set of resources in a MAC-CE in a sidelink shared channel of the groupcast sidelink communication using the first set of resources.

Aspect 16: The method of any of aspects 14 through 15, further comprising: transmitting a feedback indication to the source UE that indicates the source UE transmission is unsuccessfully received at the relay UE; and monitoring for a retransmission of the source UE communication using the second set of resources.

Aspect 17: The method of aspect 16, further comprising: receiving, from the source UE, a third set of resources for the one or more relay transmissions of the source UE communication to the destination UE.

Aspect 18: The method of any of aspects 14 through 17, wherein the destination UE provides an indication of a fourth set of resources for retransmissions of synchronized MIMO communications based on unsuccessful receipt of one or more relay transmissions from the relay UE, and wherein the relay UE determines the fourth set of resources for retransmissions of asynchronized MIMO communications based at least in part on unsuccessful receipt of the one or more relay transmissions at the destination UE.

Aspect 19: The method of any of aspects 14 through 15, wherein the first set of resources includes multiple periodic resource reservations for a first predetermined number of instances of the source UE communication, and the second set of resources includes multiple periodic resource reservations for a second predetermined number of instances of the cooperative MIMO sidelink communications from the relay UE to the destination UE, and wherein each of the first set of resources and the second set of resources is associated with a source ID of the source UE.

Aspect 20: The method of aspect 19, wherein the destination UE reserves a set of periodic MIMO retransmission resources based at least in part on an unsuccessful decoding of the cooperative MIMO sidelink communications in the second set of resources.

Aspect 21: The method of any of aspects 14 through 20, further comprising: determining that a different source UE has indicated overlapping resources with one or more of the first set of resources or the second set of resources; and selecting which source UE to monitor based at least in part on a priority associated with the source UE communication and a relayed communication of the different source UE.

Aspect 22: The method of any of aspects 14 through 21, further comprising: determining that the second set of resources overlaps with a third set of resources reserved by a different source UE for one or more different relay transmissions of the different source UE; and selecting which relay transmission to transmit to the destination UE based at least in part on a priority of the associated communication, a timing of the associated communication, or any combinations thereof.

Aspect 23: An apparatus for wireless communication at a source UE, comprising a processor; memory coupled with the processor; and instructions stored in the memory and executable by the processor to cause the apparatus to perform a method of any of aspects 1 through 13.

Aspect 24: An apparatus for wireless communication at a source UE, comprising at least one means for performing a method of any of aspects 1 through 13.

Aspect 25: A non-transitory computer-readable medium storing code for wireless communication at a source UE, the code comprising instructions executable by a processor to perform a method of any of aspects 1 through 13.

Aspect 26: An apparatus for wireless communication at a relay UE, comprising a processor; memory coupled with the processor; and instructions stored in the memory and executable by the processor to cause the apparatus to perform a method of any of aspects 14 through 22.

Aspect 27: An apparatus for wireless communication at a relay UE, comprising at least one means for performing a method of any of aspects 14 through 22.

Aspect 28: A non-transitory computer-readable medium storing code for wireless communication at a relay UE, the code comprising instructions executable by a processor to perform a method of any of aspects 14 through 22.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a source user equipment (UE), comprising:
   transmitting, from the source UE to a set of relay UEs, a resource reservation message that indicates a first set of resources for a source UE communication from the source UE to the set of relay UEs, and a second set of resources for one or more relay transmissions of the source UE communication from the set of relay UEs to a destination UE, wherein the first set of resources are groupcast sidelink resources for a groupcast sidelink communication from the source UE to the set of relay UEs, and the second set of resources are cooperative multiple-input multiple-output resources for cooperative multiple-input multiple-output sidelink communications from the set of relay UEs to the destination UE; and
   transmitting the source UE communication to the set of relay UEs in the groupcast sidelink communication using the first set of resources.

2. The method of claim 1, wherein the transmitting the resource reservation message comprises:
   transmitting sidelink control information (SCI) in a sidelink control channel to each UE of the set of relay UEs, wherein the SCI indicates the first set of resources and the second set of resources.

3. The method of claim 1, wherein the transmitting the resource reservation message comprises:
   transmitting a first indication of the first set of resources in a sidelink groupcast scheduling message to each UE of the set of relay UEs; and
   transmitting a second indication of the second set of resources in a medium access control (MAC) control element (CE) in a sidelink shared channel of the groupcast sidelink communication using the first set of resources.

4. The method of claim 1, further comprising:
   receiving a feedback indication from one or more relay UEs of the set of relay UEs that indicates the source UE transmission is unsuccessfully received at the set of relay UEs; and
   retransmitting the source UE communication to the set of relay UEs using the second set of resources.

5. The method of claim 4, wherein the cooperative multiple-input multiple-output (MIMO) sidelink communications from the set of relay UEs to the destination UE are for asynchronized MIMO communications, and wherein the retransmitting uses a first available resource of the second set of resources.

6. The method of claim 4, further comprising:
   determining a third set of resources for the one or more relay transmissions of the source UE communication from the set of relay UEs to the destination UE; and
   transmitting an indication of the third set of resources to the set of relay UEs.

7. The method of claim 1, wherein the second set of resources are for synchronized multiple-input multiple-output (MIMO) communications between the set of relay UEs and the destination UE, and wherein the destination UE provides an indication of a fourth set of resources for retransmissions of the synchronized MIMO communications based on unsuccessful receipt of the one or more relay transmissions.

8. The method of claim 1, wherein the second set of resources are for asynchronized multiple-input multiple-output (MIMO) communications between the set of relay UEs and the destination UE, and wherein each relay UE of the set of relay UEs determines an associated retransmission resource based at least in part on an unsuccessful receipt of the one or more relay transmissions.

9. The method of claim 1, wherein the first set of resources includes multiple periodic resource reservations for a first predetermined number of instances of the source UE communication, and the second set of resources includes multiple periodic resource reservations for a second predetermined number of instances of the cooperative multiple-input multiple-output (MIMO) sidelink communications from the set of relay UEs to the destination UE, and wherein each of the first set of resources and the second set of resources is associated with a source ID of the source UE.

10. The method of claim 9, further comprising:
receiving, at the source UE from one or more relay UEs of the set of relay UEs, a block feedback indication of successful or unsuccessful receipt of the source UE communication at the associated relay UE; and
determining a new first set of resources and new second set of resources when the block feedback indication indicates unsuccessful receipt of the source UE communication.

11. The method of claim 9, wherein the destination UE reserves a set of periodic MIMO retransmission resources based at least in part on an unsuccessful decoding of the cooperative MIMO sidelink communications in the second set of resources.

12. The method of claim 1, further comprising:
determining that a different source UE has indicated overlapping resources with one or more of the first set of resources or the second set of resources; and
transmitting or preempting the source UE communication based at least in part on a priority associated with the source UE communication and a relayed communication of the different source UE.

13. The method of claim 1, wherein each relay UE of the set of relay UEs determines which of the source UE communication or a different communication of a different source UE are to be transmitted to the destination UE when the second set of resources overlaps with relay resources reserved by the different source UE, and wherein the determination is based at least in part on a priority of the associated communication, a timing of the associated communication, or any combinations thereof.

14. A method for wireless communication at a relay user equipment (UE), comprising:
receiving, at the relay UE from a source UE, a resource reservation message that indicates a first set of resources for a source UE communication from the source UE, and a second set of resources for one or more relay transmissions of the source UE communication to a destination UE, wherein the first set of resources are groupcast sidelink resources for a groupcast sidelink communication from the source UE to the relay UE, and the second set of resources are cooperative multiple-input multiple-output resources for cooperative multiple-input multiple-output sidelink communications between the relay UE and the destination UE; and
monitoring the first set of resources for the source UE communication.

15. The method of claim 14, wherein the receiving the resource reservation message comprises:

receiving sidelink control information (SCI) in a sidelink control channel from the source UE, wherein the SCI indicates the first set of resources and the second set of resources; or
receiving a first indication of the first set of resources in a sidelink groupcast scheduling message from the source UE, and receiving a second indication of the second set of resources in a medium access control (MAC) control element (CE) in a sidelink shared channel of the groupcast sidelink communication using the first set of resources.

16. The method of claim 14, further comprising:
transmitting a feedback indication to the source UE that indicates the source UE transmission is unsuccessfully received at the relay UE; and
monitoring for a retransmission of the source UE communication using the second set of resources.

17. The method of claim 16, further comprising:
receiving, from the source UE, a third set of resources for the one or more relay transmissions of the source UE communication to the destination UE.

18. The method of claim 14, wherein:
the destination UE provides an indication of a fourth set of resources for retransmissions of synchronized multiple-input multiple-output (MIMO) communications based on unsuccessful receipt of one or more relay transmissions from the relay UE, and
wherein the relay UE determines the fourth set of resources for retransmissions of asynchronized MIMO communications based at least in part on unsuccessful receipt of the one or more relay transmissions at the destination UE.

19. The method of claim 14, wherein the first set of resources includes multiple periodic resource reservations for a first predetermined number of instances of the source UE communication, and the second set of resources includes multiple periodic resource reservations for a second predetermined number of instances of the cooperative multiple-input multiple-output (MIMO) sidelink communications from the relay UE to the destination UE, and wherein each of the first set of resources and the second set of resources is associated with a source ID of the source UE.

20. The method of claim 19, wherein the destination UE reserves a set of periodic MIMO retransmission resources based at least in part on an unsuccessful decoding of the cooperative MIMO sidelink communications in the second set of resources.

21. The method of claim 14, further comprising:
determining that a different source UE has indicated overlapping resources with one or more of the first set of resources or the second set of resources; and
selecting which source UE to monitor based at least in part on a priority associated with the source UE communication and a relayed communication of the different source UE.

22. The method of claim 14, further comprising:
determining that the second set of resources overlaps with a third set of resources reserved by a different source UE for one or more different relay transmissions of the different source UE; and
selecting which relay transmission to transmit to the destination UE based at least in part on a priority of the associated communication, a timing of the associated communication, or any combinations thereof.

23. An apparatus for wireless communication at a source user equipment (UE), comprising:

a processor;
memory coupled with the processor; and
instructions stored in the memory and executable by the processor to cause the apparatus to:
- transmit, from the source UE to a set of relay UEs, a resource reservation message that indicates a first set of resources for a source UE communication from the source UE to the set of relay UEs, and a second set of resources for one or more relay transmissions of the source UE communication from the set of relay UEs to a destination UE, wherein the first set of resources are groupcast sidelink resources for a groupcast sidelink communication from the source UE to the set of relay UEs, and the second set of resources are cooperative multiple-input multiple-output resources for cooperative multiple-input multiple-output sidelink communications from the set of relay UEs to the destination UE; and
- transmit the source UE communication to the set of relay UEs in the groupcast sidelink communication using the first set of resources.

24. The apparatus of claim 23, wherein the instructions to transmit the resource reservation message are executable by the processor to cause the apparatus to:
- transmit a first indication of the first set of resources in a sidelink groupcast scheduling message to each UE of the set of relay UEs; and
- transmit a second indication of the second set of resources in a medium access control (MAC) control element (CE) in a sidelink shared channel of the groupcast sidelink communication using the first set of resources.

25. The apparatus of claim 23, wherein the instructions are further executable by the processor to cause the apparatus to:
- receive a feedback indication from one or more relay UEs of the set of relay UEs that indicates the source UE transmission is unsuccessfully received at the set of relay UEs;
- retransmit the source UE communication to the set of relay UEs using the second set of resources;
- determine a third set of resources for the one or more relay transmissions of the source UE communication from the set of relay UEs to the destination UE; and
- transmit an indication of the third set of resources to the set of relay UEs.

26. The apparatus of claim 23, wherein the instructions are further executable by the processor to cause the apparatus to:
- determine that a different source UE has indicated overlapping resources with one or more of the first set of resources or the second set of resources; and
- transmit or preempt the source UE communication based at least in part on a priority associated with the source UE communication and a relayed communication of the different source UE.

27. An apparatus for wireless communication at a relay user equipment (UE), comprising:
a processor;
memory coupled with the processor; and
instructions stored in the memory and executable by the processor to cause the apparatus to:
- receive, at the relay UE from a source UE, a resource reservation message that indicates a first set of resources for a source UE communication from the source UE, and a second set of resources for one or more relay transmissions of the source UE communication to a destination UE, wherein the first set of resources are groupcast sidelink resources for a groupcast sidelink communication from the source UE to the relay UE, and the second set of resources are cooperative multiple-input multiple-output resources for cooperative multiple-input multiple-output sidelink communications between the relay UE and the destination UE; and
- monitor the first set of resources for the source UE communication.

28. The apparatus of claim 27, wherein the instructions to receive the resource reservation message are executable by the processor to cause the apparatus to:
- receive sidelink control information (SCI) in a sidelink control channel from the source UE, wherein the SCI indicates the first set of resources and the second set of resources; or
- receive a first indication of the first set of resources in a sidelink groupcast scheduling message from the source UE, and receiving a second indication of the second set of resources in a medium access control (MAC) control element (CE) in a sidelink shared channel of the groupcast sidelink communication using the first set of resources.

29. The apparatus of claim 27, wherein the instructions are further executable by the processor to cause the apparatus to:
- transmit a feedback indication to the source UE that indicates the source UE transmission is unsuccessfully received at the relay UE; and
- monitor for a retransmission of the source UE communication using the second set of resources.

30. The apparatus of claim 27, wherein the instructions are further executable by the processor to cause the apparatus to:
- determine that a different source UE has indicated overlapping resources with one or more of the first set of resources or the second set of resources; and
- select which source UE to monitor based at least in part on a priority associated with the source UE communication and a relayed communication of the different source UE.

* * * * *